US008762252B2

(12) United States Patent
Studnitzer et al.

(10) Patent No.: US 8,762,252 B2
(45) Date of Patent: Jun. 24, 2014

(54) OUT OF BAND CREDIT CONTROL

(75) Inventors: Ari Studnitzer, Northbrook, IL (US); Frank Kmiec, Cary, IL (US); Ryan Scott Eavy, Chicago, IL (US)

(73) Assignee: Chicago Mercantile Exchange Inc., Chicago, IL (US)

(*) Notice: Subject to any disclaimer, the term of this patent is extended or adjusted under 35 U.S.C. 154(b) by 93 days.

(21) Appl. No.: 13/461,451

(22) Filed: May 1, 2012

(65) Prior Publication Data

US 2012/0254012 A1    Oct. 4, 2012

Related U.S. Application Data

(63) Continuation-in-part of application No. 13/171,877, filed on Jun. 29, 2011, now Pat. No. 8,355,980, which is a continuation of application No. 12/778,532, filed on May 12, 2010, now Pat. No. 7,996,301, which is a continuation-in-part of application No. 11/841,258, filed on Aug. 20, 2007, now Pat. No. 7,987,135.

(51) Int. Cl.
*G06Q 40/00* (2012.01)
(52) U.S. Cl.
USPC ................................ 705/37; 705/35
(58) Field of Classification Search
USPC ...................................... 705/35, 37
See application file for complete search history.

(56) References Cited

U.S. PATENT DOCUMENTS

| | | | |
|---|---|---|---|
| 4,980,826 A | 12/1990 | Wagner | |
| 6,317,727 B1 | 11/2001 | May | |
| 6,321,212 B1 | 11/2001 | Lange | |
| 6,347,307 B1 | 2/2002 | Sandhu et al. | |
| 6,405,180 B2 | 6/2002 | Tilfors et al. | |
| 6,421,653 B1 | 7/2002 | May | |
| 6,618,707 B1 | 9/2003 | Gary | |
| 6,658,393 B1 | 12/2003 | Basch et al. | |
| 6,721,715 B2 | 4/2004 | Nemzow | |
| 6,963,856 B2 | 11/2005 | Lutnick et al. | |
| 6,996,540 B1 | 2/2006 | May | |
| 7,043,457 B1 | 5/2006 | Hansen | |

(Continued)

FOREIGN PATENT DOCUMENTS

| | | |
|---|---|---|
| CA | 2626935 | 5/2007 |
| CA | 2628879 | 5/2007 |

(Continued)

OTHER PUBLICATIONS

Special Executive Report, Increase in Position Limits on CME Russell 2000® and E-Mini® Russell 2000 Contracts, 2 pgs, Apr. 20, 2006, Chicago Mercantile Exchange, Inc.

(Continued)

*Primary Examiner* — Behrang Badii
*Assistant Examiner* — Daniel L Greene
(74) *Attorney, Agent, or Firm* — Banner & Witcoff, Ltd.1

(57) ABSTRACT

Systems, apparatuses, methods, and computer readable media may be configured for informing a first node of a first fine precision algorithm for calculating a first credit utilization associated with a trading entity, and of whether to use a first coarse precision algorithm instead of the first fine precision algorithm as long as the first credit utilization remains below a first credit threshold, receiving first credit information data from the first node and second credit information data associated with the trading entity from a second node, and determining aggregate credit information data for the trading entity based on the first credit utilization data and the second credit utilization data.

17 Claims, 13 Drawing Sheets

(56) References Cited

U.S. PATENT DOCUMENTS

| | | |
|---|---|---|
| 7,130,789 B2 | 10/2006 | Glodjo et al. |
| 7,177,833 B1 | 2/2007 | Marynowski et al. |
| 7,194,481 B1 | 3/2007 | Van Roon |
| 7,565,313 B2 | 7/2009 | Waelbroeck et al. |
| 7,734,538 B2 | 6/2010 | Bauerschmidt et al. |
| 7,970,689 B2 | 6/2011 | Glodjo |
| 7,987,135 B2 | 7/2011 | Callaway et al. |
| 7,996,301 B2 | 8/2011 | Callaway et al. |
| 8,355,980 B2 | 1/2013 | Callaway et al. |
| 2001/0056398 A1 | 12/2001 | Scheirer |
| 2002/0002530 A1 | 1/2002 | May |
| 2002/0035531 A1 | 3/2002 | Push |
| 2002/0046152 A1 | 4/2002 | Kinney et al. |
| 2002/0077947 A1 | 6/2002 | Ward et al. |
| 2002/0082967 A1 | 6/2002 | Kaminsky et al. |
| 2002/0099651 A1 | 7/2002 | May |
| 2002/0116314 A1 | 8/2002 | Spencer et al. |
| 2002/0116317 A1 | 8/2002 | May |
| 2002/0133455 A1 | 9/2002 | Howorka et al. |
| 2002/0156719 A1 | 10/2002 | Finebaum et al. |
| 2002/0169774 A1 | 11/2002 | Greenbaum et al. |
| 2002/0178102 A1 | 11/2002 | Scheinberg et al. |
| 2003/0004868 A1 | 1/2003 | Early et al. |
| 2003/0033240 A1 | 2/2003 | Balson et al. |
| 2003/0093360 A1 | 5/2003 | May |
| 2003/0125982 A1 | 7/2003 | Ginsberg et al. |
| 2003/0220868 A1 | 11/2003 | May |
| 2003/0229571 A1 | 12/2003 | May |
| 2004/0015430 A1 | 1/2004 | May |
| 2004/0015431 A1 | 1/2004 | May |
| 2004/0172337 A1 | 9/2004 | Spoonhower et al. |
| 2004/0186806 A1 | 9/2004 | Sinclair et al. |
| 2004/0236662 A1 | 11/2004 | Korhammer et al. |
| 2004/0254804 A1 | 12/2004 | Peterffy et al. |
| 2004/0260640 A1 | 12/2004 | Crosthwaite et al. |
| 2005/0044027 A1 | 2/2005 | Rodgers et al. |
| 2005/0080703 A1 | 4/2005 | Chiesa et al. |
| 2005/0086152 A1 | 4/2005 | Sweeting |
| 2005/0097027 A1 | 5/2005 | Kavanaugh |
| 2005/0108178 A1 | 5/2005 | York |
| 2005/0137964 A1 | 6/2005 | Nordlicht et al. |
| 2005/0171890 A1 | 8/2005 | Daley et al. |
| 2005/0171894 A1 | 8/2005 | Traynor |
| 2005/0246263 A1 | 11/2005 | Ogg et al. |
| 2005/0283422 A1 | 12/2005 | Myr |
| 2006/0059064 A1 | 3/2006 | Glinberg et al. |
| 2006/0059065 A1 | 3/2006 | Glinberg et al. |
| 2006/0059066 A1 | 3/2006 | Glinberg et al. |
| 2006/0059067 A1 | 3/2006 | Glinberg et al. |
| 2006/0059068 A1 | 3/2006 | Glinberg et al. |
| 2006/0059069 A1 | 3/2006 | Glinberg et al. |
| 2006/0085317 A1 | 4/2006 | Allen |
| 2006/0095363 A1 | 5/2006 | May |
| 2006/0173761 A1 | 8/2006 | Costakis |
| 2006/0190371 A1 | 8/2006 | Almgren et al. |
| 2006/0190383 A1 | 8/2006 | May |
| 2006/0265296 A1 | 11/2006 | Glinberg et al. |
| 2006/0277134 A1 | 12/2006 | Glinberg et al. |
| 2007/0011079 A1 | 1/2007 | May |
| 2007/0118453 A1 | 5/2007 | Bauerschmidt et al. |
| 2007/0118454 A1 | 5/2007 | Bauerschmidt et al. |
| 2007/0118455 A1 | 5/2007 | Albert et al. |
| 2007/0118456 A1 | 5/2007 | Glinberg et al. |
| 2007/0118457 A1 | 5/2007 | Peterffy et al. |
| 2007/0118459 A1 | 5/2007 | Bauerschmidt et al. |
| 2007/0118460 A1 | 5/2007 | Bauerschmidt et al. |
| 2007/0192242 A1 | 8/2007 | Kunz |
| 2007/0239591 A1 | 10/2007 | May |
| 2007/0282733 A1 | 12/2007 | May |
| 2007/0288346 A1 | 12/2007 | May |
| 2008/0077320 A1 | 3/2008 | Loftus et al. |
| 2008/0086408 A1 | 4/2008 | Johnson et al. |
| 2009/0055303 A1 | 2/2009 | Callaway et al. |
| 2009/0089200 A1 | 4/2009 | Stephen et al. |

FOREIGN PATENT DOCUMENTS

| | | |
|---|---|---|
| CA | 2628944 | 5/2007 |
| EP | 1680763 | 7/2008 |
| EP | 1949324 | 7/2008 |
| EP | 1949326 | 7/2008 |
| EP | 1949329 | 7/2008 |
| EP | 1952333 | 8/2008 |
| EP | 1952334 | 8/2008 |
| EP | 1952335 | 8/2008 |
| IN | 913/MUMNP/2008 | 5/2008 |
| IN | 940/MUMNP/2008 | 5/2008 |
| IN | 913/MUMNP/2008 | 7/2008 |
| IN | 940/MUMNP/2008 | 8/2008 |
| JP | 2009516299 | 4/2004 |
| JP | 2008-541147 | 11/2008 |
| JP | 2008-541219 | 11/2008 |
| JP | 2008-541410 | 11/2008 |
| JP | 2009516292 | 4/2009 |
| JP | 2009516878 | 4/2009 |
| WO | 2005043273 | 5/2005 |
| WO | 2007/021859 | 2/2007 |
| WO | 2007058684 | 5/2007 |
| WO | 2007061456 | 5/2007 |
| WO | 2007061617 | 5/2007 |
| WO | 2007061857 | 5/2007 |
| WO | 2007061961 | 5/2007 |
| WO | 2007061970 | 5/2007 |

OTHER PUBLICATIONS

Notice—Revised Position Limits in Treasury Futures During Last Ten Trading Days, Jul. 19, 2006, Paul J. Draths—Vice President & Secretary, Chicago Board of Trade, 3 pgs.
CME EOS Trader™ Enhancements: Credit Controls, Chicago Mercantile Exchange, Inc., Mar. 25, 2007, 3 pgs.
Position Limits and Position Accountability, ICE Futures U.S., Feb. 15, 2008, www.theice.com, 5 pgs.
Globex® Interface Development and Testing Agreement, Chicago Mercantile Exchange, Inc., 12 pgs, date unknown, Feb. 7, 2008.
Nina Mehta, "Fast and Furious: Risk Management in a DMA Environment", Jul./Aug. 2006 Futures Industry, 3 pgs.
http://www.cme.com/trading/res/reg/position.html, Position Limits/ Accountability & Reportable Levels, Chicago Mercantile Exchange, Inc., Aug. 6, 2008, 1 page.
http://rulebook.cme.corn/Rulebook/utilities/allPositionLimits.html, CME Rulebook—Position Limits and Accountability for All Products, Chicago Mercantile Exchange, Inc., Aug. 6, 2008, 40 pgs.
http://www.rulebook.cme.com/Rulebook/utilities/ positionLimitIndex.html, CME Rulebook—Position Limit and Position Accountability Definitions, Rules, and Levels, Chicago Mercantile Exchange, Inc., Aug. 6, 2008, 5 pgs.
http://www.cme.com/files/005.pdf, CME Rulebook, Chapter 5—Trading Qualifications and Practices, Chicago Mercantile Exchange, 63 pgs, Dec. 1, 2008.
http://www.cbot.com/cbot/pub/cont_detail/ 0,3206,1032+42998,00.html, Position Limits in Treasury Futures for Dec. 2006 Contracts, Chicago Board of Trade, 1 page.
http://www.cftc.gov/industryoversight/contractsandproducts/ sfpspeculativelimits.html, Security Futures Products Speculative Position Limits, Jul. 26, 2007, U.S. Commodity Futures Trading Commission, 1 page.
International Search Report in related International Application No. PCT/US06/27762, dated Mar. 9, 2007.
International Search Report in related International Application No. PCT/US06/28001, dated May 7, 2007.
International Search Report in related International Application No. PCT/US06/43282, dated May 30, 2008.
International Search Report in related International Application No. PCT/US06/44702, dated Aug. 17, 2007.
International Search Report in related International Application No. PCT/US076/44917, dated Aug. 28, 2007.
International Search Report in related International Application No. PCT/US06/44932, dated Aug. 19, 2008.

(56) References Cited

OTHER PUBLICATIONS

International Search Report in related International Application No. PCT/US08/71452 dated Oct. 7, 2008.
International Search Report in related International Application No. PCT/IB04/52236, dated Mar. 23, 2006.
CME® Clearing Services, "Layout for Results product description [online]", Chicago Mercantile Exchange, 2005, obtained from http://web.archive.org/web/20050308181020/http://www.cme.com/clearing/rmspan/cm/reclayout1239.html, last retrieved on Feb. 22, 2007.
CME® Foreign Exchange Products, "Trading CME FX Futures: Maximizing the Opportunity for the Individual Investor," 2005, 6 pages.
CME® , "Glossary for Retail FX," obtained from http://www.cme.com/files/FXWebglossary.pdf, last retrieved on Nov. 7, 2005, 16 pages.
CME® Clearing Services, "CME and LCH product description [online]", Chicago Mercantile Exchange, 2005, obtained from http://web.archive.org/web/20050306002321/http://www.cme.com/clearing/rmspan/cm/ich1238.htm, last retrieved on Feb. 22, 2007.
Position Limit, http://www.investopedia.com/terms/p/positionlimit.asp, retrieved on Jun. 10, 2010, 4 pages.
Position Limit and Reportable Level Table, 3 pages, Chicago Board of Trade, revised Mar. 2008, 4 pages.
CME Rulebook; http://www.cmegroup/rulebook/CME/1/5/, revised Apr. 2008, 55 pages.
International Search Report from International Application No. PCT/US09/52701 dated Sep. 15, 2009, 2 pages.
CME, Components of SPAN: SPAN: Clearing Services, obtained at http://web.archive.org/web/20030819161552/http://www.cme.com/clr/rmspan/compont2480.html, printed Jan. 9, 2008 from internet archive Aug. 13, 2003, 9 pages.
Supplementary European Search Report dated Sep. 5, 2012, PCT/722008071452, Application No. 08827956.7-1238/2179390, 8 pages.
International Search Report, PCT/US11/36285, mailed Aug. 2, 2011, 11 pages.
Examiner's First Report in AU 2008289307 dated Jun. 1, 2012.
Office Action in EP08827956.7 dated Jan. 17, 2013.
Office Action in EP08827956.7 dated May 29, 2012.
International Preliminary Report on Patentability in PCT/US2011/036285 dated Nov. 13, 2012, with Written Opinion dated Aug. 2, 2011.
International Preliminary Report on Patentability in PCT/US2009/052701 dated Feb. 8, 2011, with Written Opinion dated Sep. 15, 2009.
Written Opinion in PCT/US08/71452 dated Oct. 7, 2008.
International Preliminary Report on Patentability with Written Opinion in PCT/US2013/38341 dated Aug. 6, 2013.
International Search Report and Written Opinion in PCT/US13/39087 mailed Aug. 19, 2013.
European Patent Application No. 08827956 Extended European Search Report dated May 9, 2012.
Patent Examination Report No. 1 in AU2009279803 dated Oct. 18, 2013.
Patent Examination Report No. 1 in AU2011252961 dated Oct. 21, 2013.

Variable Defined Derivative Product Order 500

- 502 → Account number: _____
- 504 → Underlying Contract: _____
- 506 → Expiration Month: _____
- 508 → Put or Call: _____
- 510 → Buy or Sell: _____
- 512 → Quantity: _____
- 514 → Strike Price: _____
- 516 → Delta: _____
- 518 → Gamma: _____
- 520 → Vega: _____
- 522 → Hedge Order: _____
  - 524 → ○ Contingent
  - 526 → ○ Best Efforts
- 528 → Formula
  - 530 → ○ Standard  ChgUnderlyingPrice*delta+(1/2(ChgUnderlying*gamma)^2)
  - 532 → ○ Custom
    - 534 → Formula: _____
    - 536 → Variables: _____

Figure 5

OUT OF BAND CREDIT CONTROL

CROSS REFERENCE TO RELATED APPLICATIONS

This application is a continuation-in-part of U.S. patent application Ser. No. 13/171,877 (now U.S. Pat. No. 8,355,980), filed Jun. 29, 2011, which is a continuation of U.S. patent application Ser. No. 12/778,532 (now U.S. Pat. No. 7,996,301) filed May 12, 2010, which is a continuation-in-part of U.S. patent application Ser. No. 11/841,258 (now U.S. Pat. No. 7,987,135), entitled, "Out of Band Credit Control," filed Aug. 20, 2007, each of which is herein incorporated by reference in its entirety.

FIELD OF THE INVENTION

The present invention relates to credit control and risk management in a distributed derivative product trading environment. More particularly, the present invention relates to enhanced out of band credit control monitoring to provide greater risk protections.

BACKGROUND

Computer systems and networks increasingly are being used to trade securities and derivative products. Computer systems and networks provide several advantages when compared to manual methods of trading. Such advantages include increased accuracy, reduced labor costs and the ability to quickly disseminate market information.

Options are frequently traded via computer systems. An option may be used to hedge risks by allowing parties to agree on a price for a purchase or sale of another instrument that will take place at a later time. One type of option is a call option. A call option gives the purchaser of the option the right, but not the obligation, to buy a particular asset either at or before a specified later time at a guaranteed price. The guaranteed price is sometimes referred to as the strike or exercise price. Another type of option is a put option. A put option gives the purchaser of the option the right, but not the obligation, to sell a particular asset at a later time at the strike price. In either instance, the seller of the call or put option can be obligated to perform the associated transactions if the purchaser chooses to exercise its option or upon the expiration of the option.

Traders typically use theoretical models to determine the prices at which they will offer to buy and sell options. The theoretical option pricing models often produce values that reflect an option's sensitivity to changes in predefined variables. These predefined variables are assigned Greek letters, such as delta, gamma and theta or other predefinitions such as vega. Delta is a measure of the rate of change in an option's theoretical value for a one-unit change in the price of the option's underlying contract. Thus, delta is the theoretical amount by which the option price can be expected to change for a change in the price of the underlying contract. As such, delta provides a local measure of the equivalent position risk of an option position with respect to a position in the underlying contract. A "50 Delta" option should change its price $50/100$, or ½ a point, for a one point move in its underlying contract.

Gamma is a measure of the rate of change in an option's delta for a one-unit change in the price of the underlying contract. Gamma expresses how much the option's delta should theoretically change for a one-unit change in the price of the underlying contract. Theta is a measure of the rate of change in an option's theoretical value for a one-unit change in time to the option's expiration date. Vega is a measure of the rate of change in an option's theoretical value for a one-unit change in the volatility of the underlying contract. Delta, gamma, and vega are the primary risk management measures used by those who trade in options.

A single option order typically identifies the underlying security or instrument, the expiration date, whether the option is a call or a put, the strike price and other standard order terms (e.g. buy/sell, quantity, account number etc.). Each time the price of the underlying contract changes or one of the variables in the trader's theoretical model changes, a trader may cancel all of the relevant orders, recalculate new order prices and transmit new order prices to the trading engine.

Computer implemented systems for trading derivative products can increase a market maker's price exposure. In the open outcry marketplace, a market maker makes markets in strikes/spreads in a serial process. As a result, the market maker may minimize the risk of having more than one of their prices acted upon simultaneously. In contrast, computer implemented systems allow market makers to provide bid/ask spreads for several strikes and spreads simultaneously. The parallel price exposure in the electronic options marketplace can pose a risk to the market maker in that they can quickly accumulate a large risk position before they can cancel/modify their resting orders. This type price exposure is known as in-flight fill risk.

Existing attempts to protect against in-flight fill risks have resulted in reduced market making participation and corresponding detrimental affects on liquidity, trading volume and price discovery.

Therefore, there is a need in the art for systems and methods for improved derivative product trading that allow traders and exchanges to protect against risk and also provide credit control. The need for novel risk management solutions is further being driven by increases in regulatory requirements for over the counter (OTC) clearing and mandates for Swap Execution Facilities to facilitate transparent price discovery.

SUMMARY

The present invention overcomes problems and limitations of the prior art by providing trading methods and systems that utilize order risk data provided by traders. The order risk data includes order risk parameters, such as maximum delta, gamma and/or vega utilization values for derivative product contracts based on the same underlying product. A match system may then limit the trader's in-flight fill risks by tracking the trader's current order risk parameter utilization state and analyzing potential trades to determine how those trades will impact the trader's order risk parameter utilization state. The match system may also limit cumulative risks by canceling orders after an order risk parameter utilization state has been exceeded.

An embodiment may include a method of processing derivative product orders at a trading engine. The method may include receiving derivative product order risk data including at least one threshold value corresponding to at least one order risk parameter. An order for a derivative product is received from a trader. As used herein "trader" includes any source for originating an order and is not limited to mean a professional trader. The derivative product order and a trader's current order risk utilization state are utilized to calculate utilization data. The derivative product order is processed in a manner determined by the derivative product order risk data and the utilization data.

An additional or alternative method of processing derivative product orders at a trading engine includes receiving derivative product order risk data including at least one threshold value corresponding to at least one order risk parameter. An order for a derivative product is received from a trader. A trader's current order risk parameter utilization value is then determined. The derivative product order is executed when the trader's current order risk parameter utilization value does not exceed the threshold value.

An additional or alternative method of managing risks associated with derivative product orders placed at a plurality of trading engines includes transmitting to a first trading engine first derivative product order risk data including at least one threshold value corresponding to at least one order risk parameter. Second derivative product order risk data including at least one threshold value corresponding to the at least one order risk parameter is transmitted to a second trading engine. A trader's current order risk utilization states at the first trading engine and at the second trading engine are determined. The determination may then be used to transmit to the first or second trading engine an offset value to adjust the order risk parameter.

A system for monitoring risks associated with orders placed at a plurality of may include a plurality of trading engines each having an order routing mechanism and a credit control module where the credit control module is communicable with each order routing mechanism. In one embodiment, the plurality of trade engines may be located at a front-end, and the credit control module may be located at a back end. In another embodiment, the credit control module may be located on the front-end, the back end (e.g., clearing-house), or a combination thereof. The credit control module determines the volume of trades from the trading engine and compares that value to the number of trades allocated for the trading engine. If the volume of trades exceeds the allocated number of trades for the trading engine, the user's orders may be cancelled. Additionally or alternatively, if the volume of trades exceeds the allocated number of trades, the credit control module may request a credit increase from another trading engine.

An additional or alternative system for monitoring risks associated with the value of orders placed at a plurality of trading engines may include a plurality of trading engines each having an order routing mechanism and a credit control module where the credit control module is communicable with each order routing mechanism. The credit control module verifies the credit value of the trader to determine the total value of orders placed by the trader on each individual trading engine. If the value of orders on a particular trading engine exceeds a predetermined amount of the trader credit value, the credit control module can re-route the order routing mechanism to another trading engine within the plurality.

In some aspects, systems, apparatuses, methods, and computer readable media may be configured for informing a first node of a first fine precision algorithm for calculating a first credit utilization associated with a trading entity, and of whether to use a first coarse precision algorithm instead of the first fine precision algorithm as long as the first credit utilization remains below a first credit threshold, receiving first credit information data from the first node and second credit information data associated with the trading entity from a second node, and determining aggregate credit information data for the trading entity based on the first credit information data and the second credit information data.

In some aspects, systems, apparatuses, methods, and computer readable media may be configured for processing at least one instruction identifying a fine precision algorithm for calculating credit utilization associated with a trading entity, and of whether to use a coarse precision algorithm instead of the fine precision algorithm as long as the credit utilization of the trading entity remains below a credit threshold, processing an order request or a trade request associated with the trading entity for trading of a financial instrument, and determining the credit utilization of the trading entity in accordance with the instruction.

Additional or alternative embodiments may be partially or wholly implemented on a computer-readable medium, for example, by storing computer-executable instructions or modules, or by utilizing computer readable data structures.

Of course, the methods and systems of the above-referenced embodiments may also include other additional elements, steps, computer-executable instructions or computer-readable data structures. In this regard, other embodiments are disclosed and claimed herein as well.

The details of these and other embodiments of the present invention are set forth in the accompanying drawings and the description below. Other features and advantages of the invention will be apparent from the description and drawings and from the claims.

BRIEF DESCRIPTION OF THE DRAWINGS

The out of band credit control is illustrated by way of example and not limited in the accompanying figures in which like reference numerals indicate similar elements and in which:

FIG. 5 illustrates a variable defined derivative product order in accordance with an embodiment for out of band credit control;

DETAILED DESCRIPTION

Figure 1:
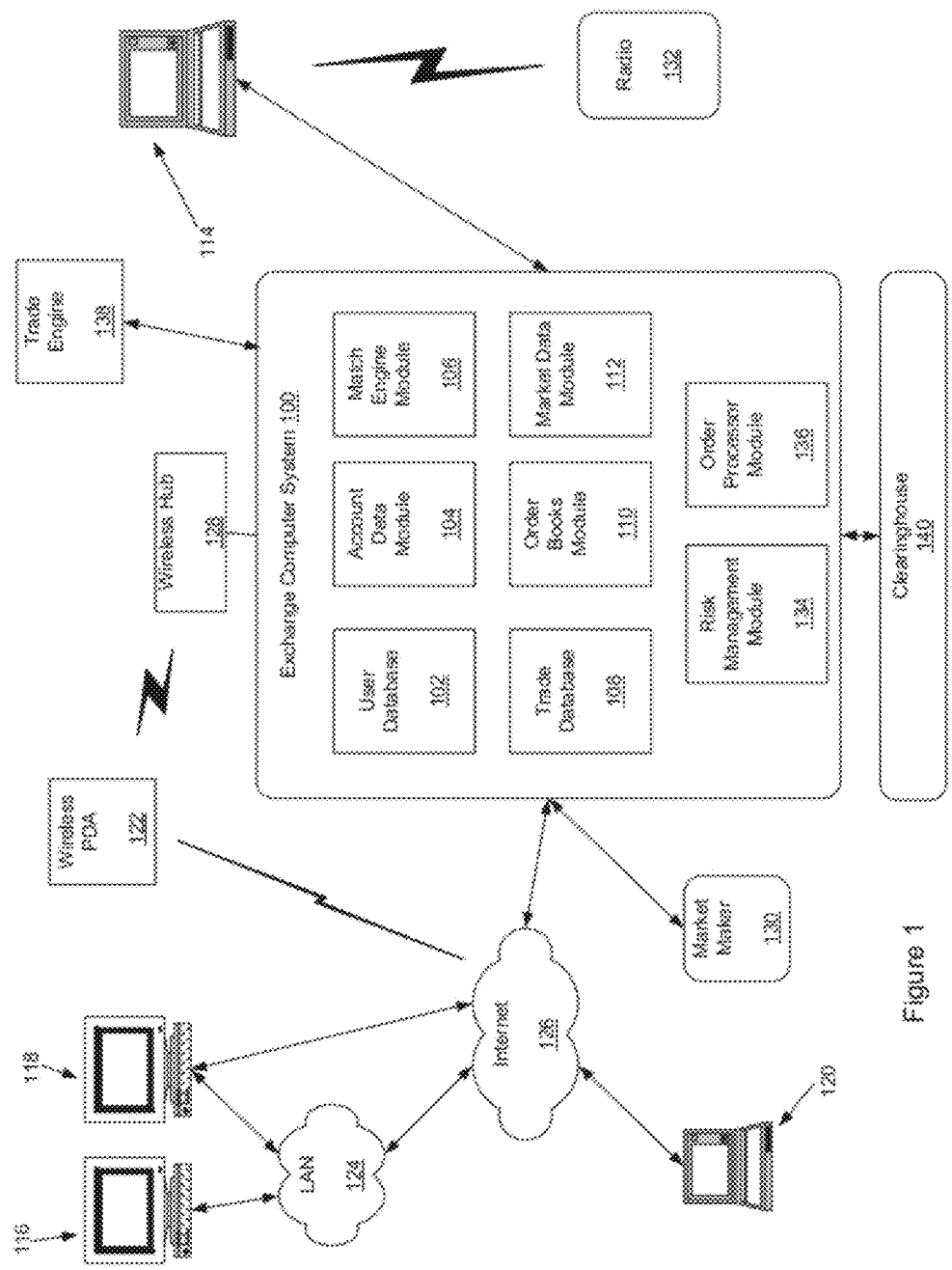
FIG. 1 shows a computer network system that may be used to implement aspects for out of band credit control.

FIG. 1 depicts an illustrative operating environment that may be used to implement various aspects of the invention.

The operating environment is only one example of a suitable operating environment and is not intended to suggest any limitation as to the scope of use or functionality of the invention. Aspects of the present invention are preferably implemented with computing devices and networks for exchanging, transmitting communicating, administering, managing and facilitating trading information including, but not limited to performance bond amount requirements and trading information. An exchange computer system 100 receives market data, analyzes historical data, and calculates various values, e.g., performance bond amounts, in accordance with aspects of the invention.

Exchange computer system 100 may be implemented with one or more mainframes, servers, gateways, controllers, desktops or other computers. The exchange computer system 100 may include one or more modules, processors, databases, mainframes, desktops, notebooks, tablet PCs, handhelds, personal digital assistants, smartphones, gateways, and/or other components, such as those illustrated in FIG. 1. Moreover, computer system 100 may include one or more processors (e.g., Intel® microprocessor, AMD® microprocessor, risk processor, etc.) and one or more memories (e.g., solid state, DRAM, SRAM, ROM, Flash, non-volatile memory, hard drive, registers, buffers, etc.) In addition, an electronic trading system 138, such as the Globex® trading system, may be associated with an exchange 100. In such an embodiment, the electronic trading system includes a combination of globally distributed computers, controllers, servers, networks, gateways, routers, databases, memory, and other electronic data processing and routing devices. The trading system may include a trading system interface having devices configured to route incoming messages to an appropriate devices associated with the trading system. The trading system interface may include computers, controllers, networks, gateways, routers and other electronic data processing and routing devices. Orders that are placed with or submitted to the trading system are received at the trading system interface. The trading system interface routes the order to an appropriate device. A trading engine computer system 100 receives orders and transmits market data related to orders and trades to users.

A user database 102 may include information identifying traders and other users of exchange computer system 100. Such information may include user names and passwords. A trader operating an electronic device (e.g., computer devices 114, 116, 118, 120 and 122) interacting with the exchange 100 may be authenticated against user names and passwords stored in the user database 112. Furthermore, an account data module 104 may process account information that may be used during trades. The account information may be specific to the particular trader (or user) of an electronic device interacting with the exchange 100.

A match engine module 106 may match bid and offer prices for orders configured in accordance with aspects of the invention. Match engine module 106 may be implemented with software that executes one or more algorithms for matching bids and offers for bundled financial instruments in accordance with aspects of the invention. The match engine module 106 and trading system interface may be separate and distinct modules or component or may be unitary parts. Match engine module may be configured to match orders submitted to the trading system. The match engine module may match orders according to currently known or later developed trade matching practices and processes. In an embodiment, bids and orders are matched on price, on a FIFO basis. The matching algorithm also may match orders on a pro-rata basis or combination of FIFO and pro rata basis. Other processes and/or matching processes may also be employed.

Moreover, a trade database 108 may be included to store historical information identifying trades and descriptions of trades. In particular, a trade database may store information identifying or associated with the time that an order was executed and the contract price. The trade database 108 may also comprise a storage device configured to store at least part of the orders submitted by electronic devices operated by traders (and/or other users). A confirmation message may be sent when the match engine module 106 finds a match for an order and the order is subsequently executed. The confirmation message may, in some embodiments, be an e-mail message to a trader, an electronic notification in one of various formats, or any other form of generating a notification of an order execution.

Furthermore, an order book module 110 may be included to compute or otherwise determine current bid and offer prices. The order book module 110 may be configured to calculate the price of a financial instrument.

A market data module 112 may be included to collect market data and prepare the data for transmission to users. In addition, a risk management module 134 may be included in computer system 100 to compute and determine the amount of risk associated with a financial product or portfolio of financial products. An order processor module 136 may be included to receive data associated with an order for a financial instrument. The module 136 may decompose delta based and bulk order types for processing by order book module 110 and match engine module 106. The order processor module 136 may be configured to process the data associated with the orders for financial instruments.

The trading network environment shown in FIG. 1 includes computer (i.e., electronic) devices 114, 116, 118, 120 and 122. The computer devices 114, 116, 118, 120 and 122 may include one or more processors, or controllers, that control the overall operation of the computer. The computer devices 114, 116, 118, 120 and 122 may include one or more system buses that connect the processor to one or more components, such as a network card or modem. The computer devices 114, 116, 118, 120 and 122 may also include interface units and drives for reading and writing data or files. Depending on the type of computer device, a user can interact with the computer with a keyboard, pointing device, microphone, pen device or other input device. For example the electronic device may be a personal computer, laptop or handheld computer, tablet pc and like computing devices having a user interface. The electronic device may be a dedicated function device such as personal communications device, a portable or desktop telephone, a personal digital assistant ("PDA"), remote control device, personal digital media system and similar electronic devices.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a local area network (LAN) 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

The operations of computer devices and systems shown in FIG. 1 may be controlled by computer-executable instructions stored on computer-readable storage medium. Embodiments also may take the form of electronic hardware, computer software, firmware, including object and/or source code, and/or combinations thereof. Embodiment may be stored on computer-readable media installed on, deployed by, resident on, invoked by and/or used by one or more data processors (e.g., risk processor), controllers, computers, clients, servers, gateways, networks of computers, and/or any combinations thereof. The computers, servers, gateways, may have one or more controllers configured to execute instructions embodied as computer software. For example, computer device 114 may include computer-executable instructions for receiving interest rate and other information from computer system 100 and displaying to a user. In another example, computer device 118 may include computer-executable instructions for receiving market data from computer system 100 and displaying that information to a user. In yet another example, a processor of computer system 100 may be configured to execute computer-executable instructions that cause the system 100 to calculate a performance bond amount required to balance risk associated with a portfolio.

One or more market makers 130 may maintain a market by providing bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems, such as clearinghouse 140. Coupling can be direct as described or any other method described herein.

A clearinghouse 140 enables an exchange computer system 100 to provide contracts with a lower likelihood of default than over-the-counter (OTC) products. A clearinghouse 140 arranges for transactions to be settled and cleared. Clearing is the procedure through which a clearinghouse 140 becomes buyer to each seller of a contract (e.g., futures contract, equities, currencies, interest rate products, etc.), and seller to each buyer, and assumes responsibility for protecting buyer and seller from financial loss by assuring performance on each contract. A clearinghouse 140 may settle trading accounts, clear trades, collect and maintain performance bond funds, regulate delivery and report trading data. In some scenarios an exchange may operate its own clearinghouse 140 through a division of the exchange through which all trades made are confirmed, matched, and settled each day until offset or delivered. Alternatively, one or more other companies may be provided the responsibility of acting as a clearinghouse 140 with the exchange (and possibly other exchanges). An exchange may have one or more clearinghouses associated with the exchange. An exchange may offer firms qualified to clear trades to provide a clearinghouse 140 for the exchange computer system 100. In some instances, these clearing members may be designated into different categories based on the type of commodities they can clear and other factors.

The clearinghouse 140 may establish minimum performance bond (i.e., margin) requirements for the products it handles. A customer may be required to deposit a performance bond with the clearinghouse 140 (or designated account) for the purpose of insuring the clearinghouse 140 against loss on open positions. The performance bond helps ensure the financial integrity of brokers, clearinghouses, and exchanges as a whole. If a trader experiences a drop in funds below a minimum requirement, the clearinghouse 140 may issue a margin call requiring a deposit into the margin account to restore the trader's equity. A clearinghouse 140 may charge additional performance bond requirements at the clearinghouse's discretion. For example, if a clearinghouse's potential market exposure grows large relative to the financial resources available to support those exposures, the clearinghouse 140 may issue a margin call.

In another embodiment, the clearinghouse 140 may require a larger performance bond based on a credit check (e.g., an analysis of the credit worthiness, such as using a FICO™ or comparable score, inter alia) of the customer/trader. The credit check may be performed (i.e., initiated) by a clearinghouse 140 or an exchange 100. In the example where the clearinghouse 140 performs the credit check, the clearinghouse 140 may send a message (e.g., enforcement message) to the exchange 100. If the credit check indicates that a customer/trader is a high risk, the enforcement message may increase the margin requirements of the customer/trader, or otherwise adjust the capabilities/constraints of the customer/trader commensurate with the higher risk. In the example where the exchange 100 initiates the credit check, the exchange 100 may send a message to one or more clearinghouses associated with the exchange 100 to update them on the increased/decreased risk associated with the customer/trader.

In recognition of the desire to promote efficient clearing procedures and to focus on the true intermarket risk exposure of clearinghouses, a cross-margining system may be used. By combining the positions of joint and affiliated clearinghouses in certain broad-based equity index futures and options into a single portfolio, a single performance bond requirement across all markets may be determined. The cross-margining system may greatly enhance the efficiency and financial integrity of the clearing system.

The principal means by which a clearinghouse 140 mitigates the likelihood of default is through mark-to-market (MTM) adjustments. The clearinghouse 140 derives its financial stability in large part by removing debt obligations among market participants as they occur. Through daily MTM adjustments, every contract is debited or credited based on that trading session's gains or losses. For example, as prices move for or against a position, funds flow into or out of the trading account. This cash flow is known as settlement variation.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Figure 2:
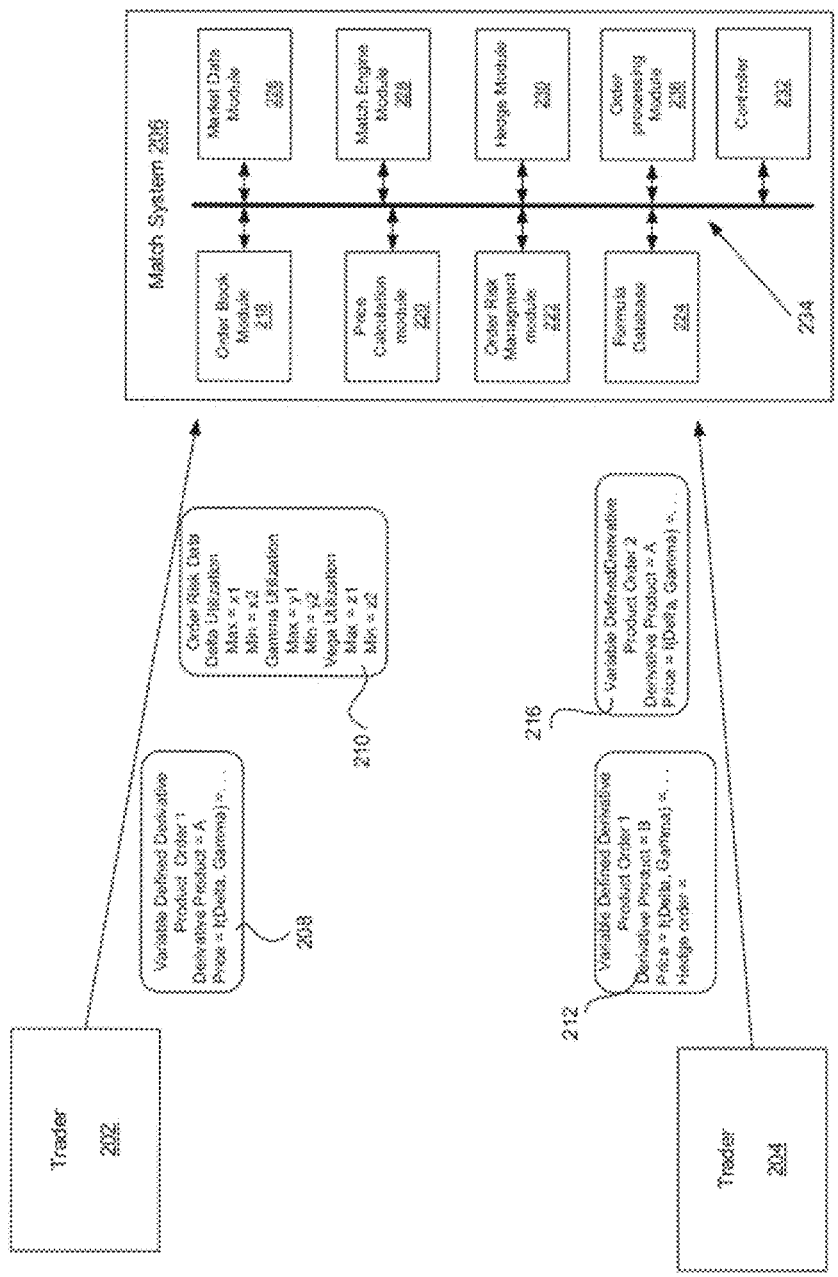
FIG. 2 illustrates a system in which traders exchange information with a match system, in accordance with an embodiment for out of band credit control.

FIG. 2 illustrates a system in which traders 202 and 204 exchange information with a match system 206, in accordance with an embodiment of the invention. Trader 202 is shown transmitting a variable defined derivative product order 208 and order risk data 210 to match system 206. Variable defined derivative product order 208 includes the identification of a derivative product and a variable order price. Variable defined derivative product orders are described in greater detail below in connection with FIG. 3. Order risk data 210 may act as a throttle to limit the number of transactions entered into by trader 202. Order risk data may include maximum and minimum values of delta, gamma and vega to utilize over a given period of time, such as a trading day. Trader 204 transmits derivative product orders 212 and 216 to match system 206. Trader may transmit several derivative product orders and may associate order risk data with one or more of the derivative product orders. As shown in order 212, one or more of the orders may include the identification of a hedge transaction.

Match system 206 may include several modules for determining prices, matching orders and executing transactions. An order book module 218 may be included to maintain a listing of current bid and offer prices. A price calculation module 220 calculates order prices based on price determination variables provided as part of variable defined derivative product orders. Price calculation module 220 may also calculate order prices based on formulas received from traders. For example, derivative product order 208 may include a formula that is a function of an underlying contract, delta and gamma. Price calculation module 220 may be configured to calculate an order price every time the price of the underlying contract changes.

Price calculation module 220 may use a default formula with price determination variable values supplied by a trader. In one embodiment, the change in a derivative product price is equal to a second order Taylor series expansion, such as:

$$\text{ChgUnderlyingPrice}*\text{delta}+(1/2(\text{ChgUnderlyingPrice}^2*\text{gamma})) \qquad (1)$$

wherein ChgUnderlyingPrice is the change in the underlying price. Trader may supply price determination variables delta and gamma and price calculation module would track the derivative product price as the underlying contract changes.

A formula database 224 may be included to store derivative product order formulas. The formulas may be provided by traders or may be standard formulas provided by an exchange. A market data module 226 may be used to collect and disseminate market data. A match engine module 228 matches bid and offer prices. Match engine module 228 may be implemented with software that executes one or more algorithms for matching bids and offers.

A hedge module 230 may be included to perform hedge transactions based on derivative product transactions. In one embodiment of the invention, hedge module 230 conducts transactions with a trading engine or match system other than match system 206. Hedge module 230 may also perform some or all of the function of risk management module 134 (shown in FIG. 1). Exemplary hedge transactions are described in detail below with references to FIGS. 6 and 7.

An order processing module 236 may be included to decompose variable defined derivative product and bulk order types for processing by order book module 218 and match engine module 228. A controller 232 may be included to control the overall operation of the components shown coupled to bus 234. Controller 232 may be implemented with a central processing unit.

An order risk management module 222 is included to limit as in-flight fill risks. For example, trader 202 provided maximum and minimum delta, gamma and vega utilization values to match system 206. Those values may be stored in order risk management module 222 and tracked and computed before executing transactions.

Figure 3:
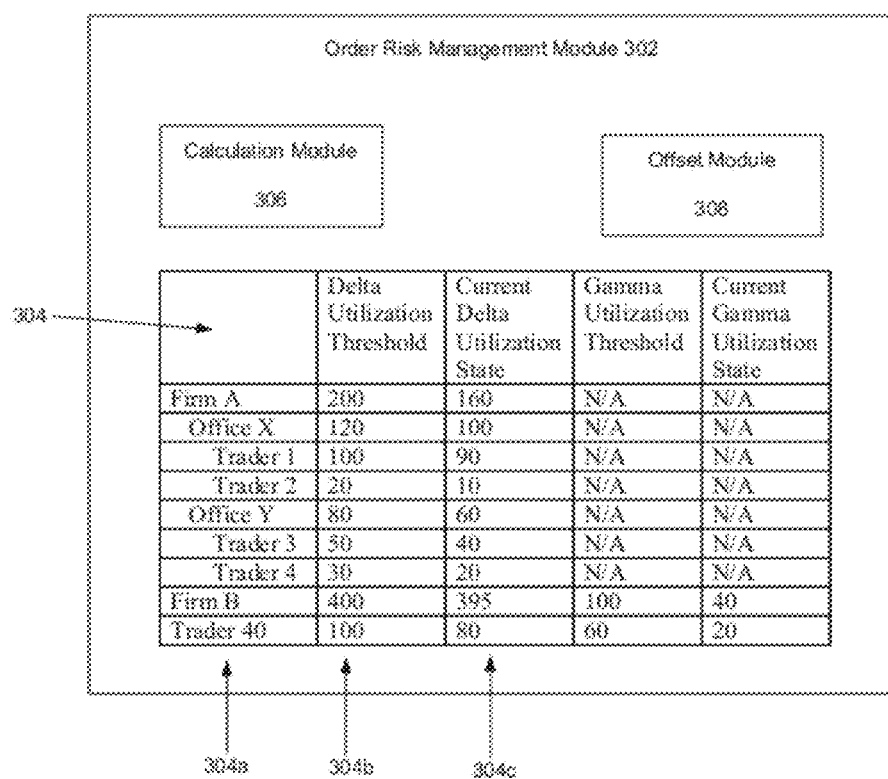
FIG. 3 illustrates an order risk management module in accordance with an embodiment for out of band credit control.

FIG. 3 illustrates an order risk management module 302 in accordance with an embodiment of the invention. A database 304 stores order risk parameter settings. Column 304b, for example, includes delta utilization threshold values. Delta utilization threshold values may be included in order risk data 210 that is transmitted from trader 202 to match system 206. Database 304 may also include the current state of order risk parameters. Column 304c, for example, includes the current delta utilization state for the entities listed in column 304a. The current utilization state of an order risk parameter is calculated by adding together the utilization values of the order risk parameter from previous trades. For example, if a trader is involved in two trades having individual delta utilization values of +45 and +60, after the second trade is executed, the trader's delta utilization state would be equal to +105.

Database 304 shows an embodiment in which several levels of order risk parameters may be used. For example, firm A has offices X and Y and employs traders 1-4. Trader 1 is obligated to comply with the order risk parameters for himself, office X and firm A. Providing order risk parameter settings in a hierarchal manner allows entities to allocate risks among subordinate entities.

Order risk management module 302 may also include a calculation module 306 for calculate order risk parameter values. An offset module 308 may be used to process offset values received from traders. An offset value may be used to provide an adjustment to an order risk parameter threshold value. For example, firm A can increase its delta utilization threshold to 220 by providing an offset value of 20. In one embodiment of the invention, an entity may allow subordinate entities to provide offset values and place limits on the use of offsets. Match system 206 may also be configured to regulate the use of offsets.

Figure 4:
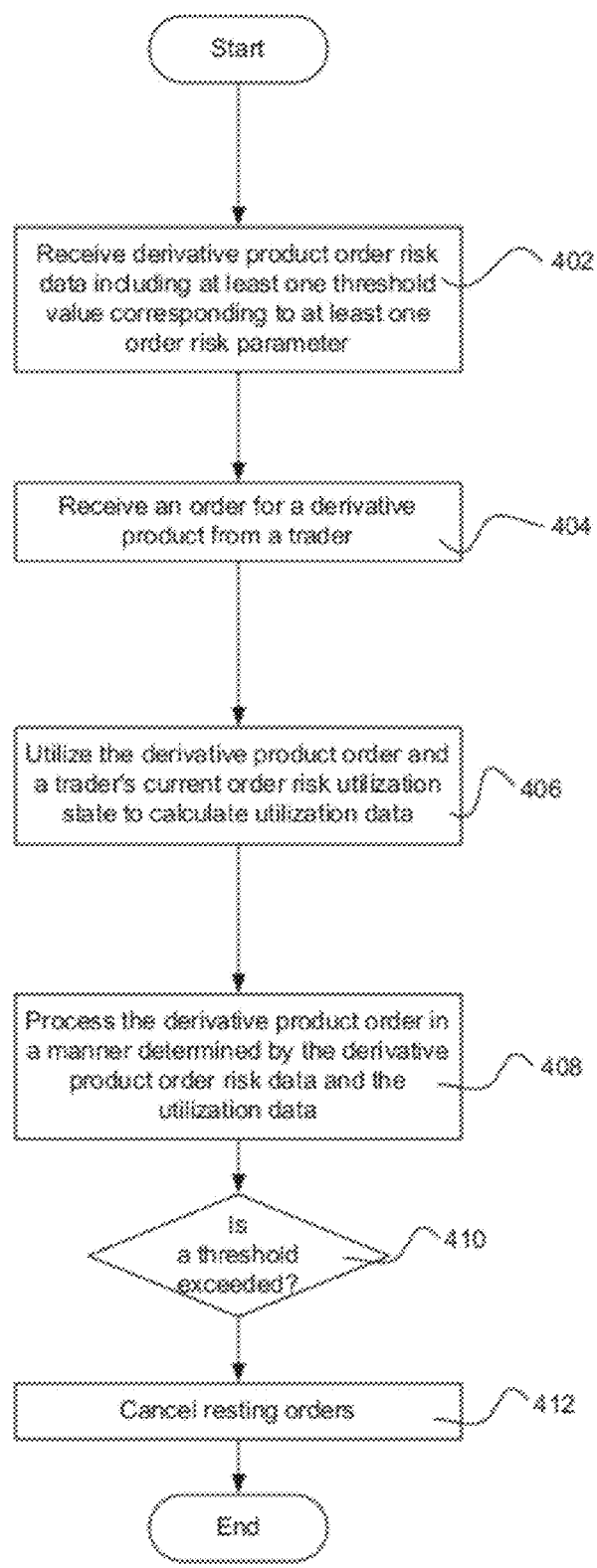
FIG. 4 illustrates a method of processing derivative product orders at a trading engine, in accordance with an embodiment for out of band credit control.

FIG. 4 illustrates a method of processing derivative product orders at a trading engine, in accordance with an embodiment of the invention. In step 402 a matching system receives derivative product order risk data including at least one threshold value corresponding to lease one order risk parameter. Step 402 may include receiving order risk data 210. Next, the match system receives an order for a derivative product from a trader in step 404. Step 404 may include receiving a variable defined derivative product order, as has been described above. In step 406, the match system utilizes the derivative product order and a trader's current order risk utilization state to calculate utilization data. In some embodiments, step 406 may include applying the utilization of a hedge transaction that accompanies a derivative product order so that the utilization data accounts for the hedge transaction. Of course, when the trader is a subordinate entity, step 406 may include utilizing the current order risk utilization state of one or more additional entities. For example, with respect to FIG. 3, when analyzing trader 1's current utilization state, the utilization states of office X and firm A should also be analyzed. This is because trader 1 may be below his utilization threshold, but office X or firm A may be over the relevant utilization threshold.

In step 408 the derivative product order is processed in a manner determined by the derivative product order risk data and the utilization data. If the execution of the trade would not cause the resulting utilization data to exceed the relevant utilization threshold, the trade is executed. There are several alternatives for treating orders that would cause the utilization data to exceed a relevant utilization threshold value. In a first embodiment, a portion of the derivative product order is executed. The portion includes the maximum number of contracts that do not cause the utilization data to exceed the threshold value. In an additional or alternative embodiment, a portion of the order that includes the minimum number of contracts that cause the utilization data to exceed the threshold value is executed. In still an additional or alternative embodiment, the entire order is fully actionable, even if filling the smallest portion of the order exceeds the risk limits. For example, if four contracts would not cause the utilization data to exceed the threshold value and five contracts would, five contracts are executed. Of course other embodiments may involve other trading units. For example, if a contract is typically traded in units of 100 contracts, each group of 100 contracts would be treated as a trading unit and treated like the individual contracts discussed above.

In an additional or alternative embodiment an entire order is canceled if the order would result in a trader's order risk utilization state exceeding the threshold value after the trade is executed. For example, if the execution of an order for five contracts would cause the threshold value to be exceeded, no contracts are executed. Additionally or alternatively, a derivative product order is executed as long as a trader's current order risk utilization state (before execution of the order) does not exceed the threshold value.

In step 410 it is determined whether the trader's order risk utilization state exceeds a threshold value. When a threshold has been exceeded, some or all of the trader's resting orders may be cancelled in step 412. In various embodiments all resting orders or all resting orders within an option class are cancelled. Additionally or alternatively, all risk-increasing orders may be cancelled. For example, if a positive delta limit has been exceeded, then all call bids and put offers are cancelled. If a negative delta limit has been exceeded, then all call offers and put bids are cancelled. If a positive gamma limit has been exceeded, then all call and put bids are cancelled. Likewise, if a negative gamma limit has been exceeded, all call and put offers are cancelled.

Returning to FIG. 2, match system 206 may include modules that perform some or all of the functions of the modules shown in FIG. 1. Moreover, match system 206 may also be coupled to some or all of the elements shown in FIG. 1. Match system 206 may also be configured to transmit warning messages to traders alerting them of order risk utilization states. Match system 206 may also include or be coupled to an interface that allows traders to check current order risk utilization states via the Internet, another network, telephone, etc.

FIG. 5 illustrates a variable defined derivative product order 500 in accordance with an embodiment of the invention. Variable defined derivative product order 500 may include a field 502 for identifying a trader's account number. The underlying contract may be identified in field 504. The expiration month of the derivative product order may be identified in field 506. The order may be identified as a put or a call in field 508 and whether the order is a buy or sell in field 510. The quantity may be identified in field 512 and the strike price may be identified in field 514. Delta, gamma, and vega values may be identified in fields 516, 518 and 520 respectively. Of course, other price determination variables may also be identified as part of a standard variable defined derivative product order.

A hedge transaction may be identified in field 522. The user may choose to make the derivative product order contingent on the existence of an available hedge transaction by selecting radio button 524. The user may also choose to use best efforts to fill the hedge order after the execution of the derivative product order by selecting radio button 526.

The formula for calculating the price of variable defined derivative product order is identified in field 528. The trader can select a standard formula 530 to compute their derivative product price or select a custom formula 532. In one embodiment, a standard formula is supplied by or sponsored by an exchange. When a custom formula is selected, the trader may also provide a formula in field 534 and the variables in field 536. In one implementation of the invention, variable defined derivative product order 500 is created in the form of an XML for HTML document created by one of the computer devices shown in FIG. 1. Variable defined derivative product order 500 may be encrypted before being transmitted to a trading engine. Of course one or more additional or alternative fields may be included. For example, a reference price may be included to protect against mispricing conditions.

Figure 6:
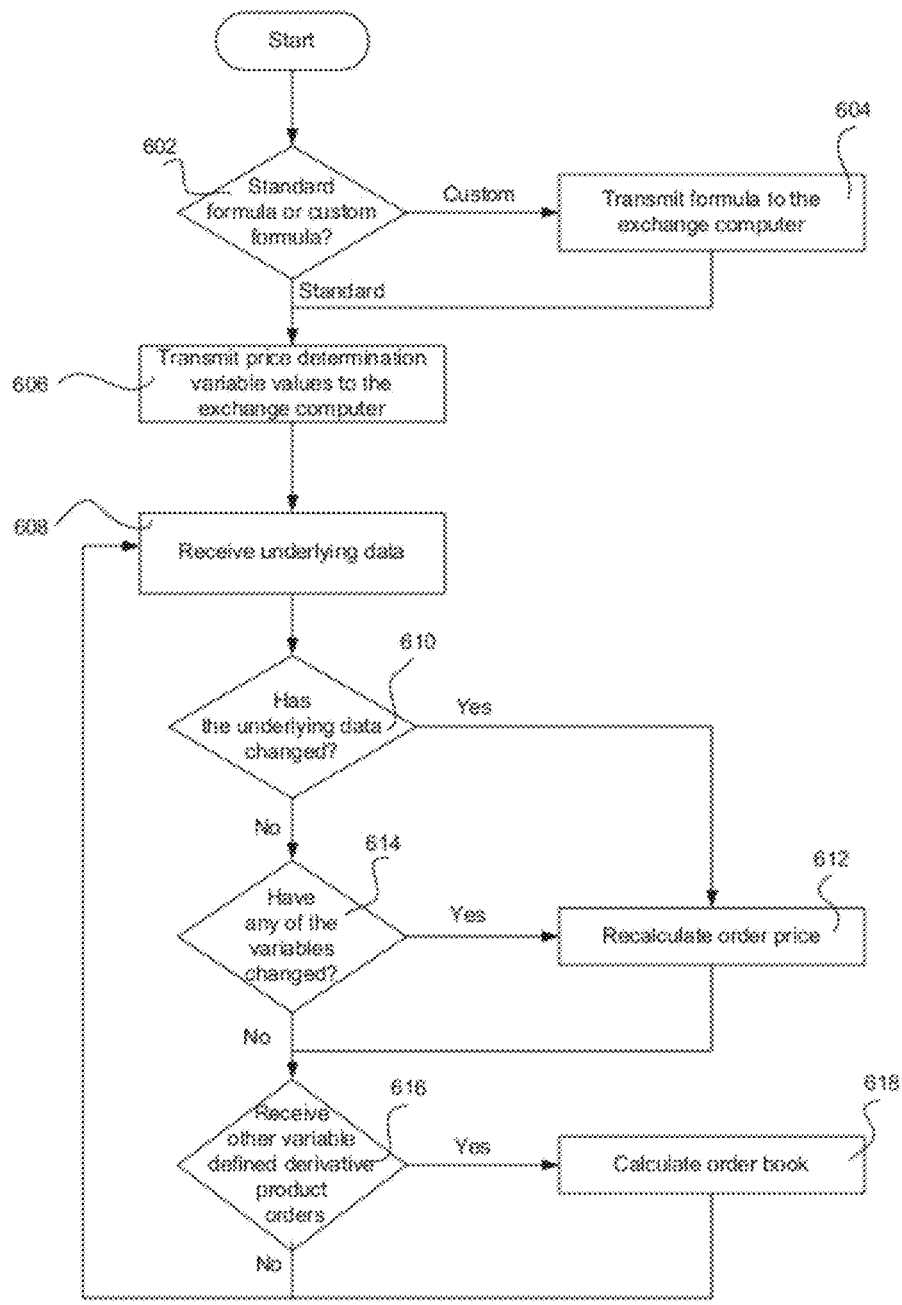
FIG. 6 illustrates a method of processing variable defined derivative product orders by a trading engine computer, in accordance with an embodiment for out of band credit control.

FIG. 6 illustrates a computer-implemented method of trading a derivative product contract that involves the use of a variable order price, in accordance with an embodiment of the invention. First, in step 602 it is determined whether the trader desires to use a standard exchange sponsored formula. When the trader uses a custom formula, the formula is transmitted to the exchange computer in step 604. Step 604 may also include the trader or exchange transmitting the formula to other market participants. In step 606, the trader transmits price determination variable values for the standard formula to an exchange computer. For example, step 606 may include transmitting delta and gamma values to an exchange computer. Step 606 may also include transmitting a formula and price determination variables to other computers so that other computers may calculate an order book. Additionally or alternatively, the exchange computer may distribute all formulas and price determination variables to user computers. In step 608 the trader receives underlying data. The underlying data may include current bid and offer prices for underlying put and call futures contracts.

In step 610 it is determined whether the underlying data has changed. The price of an underlying contract may change multiple times per second. When the underlying contract data has changed, in step 612 the trader's computer device may recalculate the order price of their variable defined derivative product order and all other variable defined derivative product orders from other users based on current data. In step 614, it is determined whether any of the price determination variables used in the formula to calculate the order price have changed. The price determination variables may include delta, gamma, and vega. When the price determination variables have changed, in step 612, the order price is recalculated. Of course, step 612 may be performed based on changes in current underlying contract data and variables. The order price may be displayed to the trader or plotted on a graph that tracks order prices.

A trading engine computer or match system may transmit a plurality of variable defined derivative product orders to several different traders only when other derivative product order users establish their initial positions. The exchange computer may then transmit underlying data or other data used to calculate variable defined derivative product order prices. Each trader computer may periodically calculate current order prices based on information received from the exchange computer. For example, in step 616 it is determined whether other variable defined derivative product orders are received. When variable defined derivative product orders are received, in step 618 the trader computer may calculate new order book listings for current bids and offers related to variable defined derivative product based orders. The order book may be displayed to the trader in any one of a variety of conventional formats. After step 618, control returns to step 608.

Figure 7:
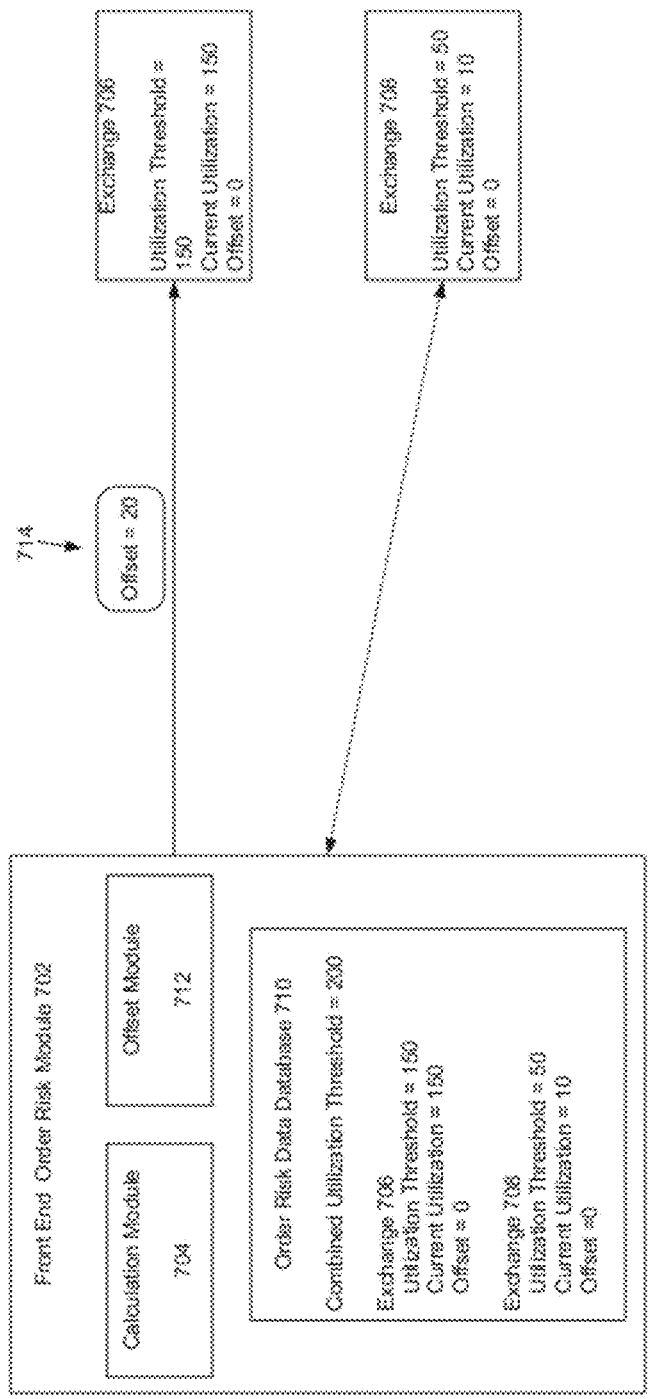
FIG. 7 illustrates a front-end system that may be used to manage risks associated with derivative product orders placed at a plurality of trading engines.

FIG. 7 illustrates a front-end system that may be used to manage risks associated with derivative product orders placed at a plurality of exchanges, in accordance with an embodiment of the invention. A front-end order risk module 702 may reside on a terminal connected to one or more trading engines via a network, such as the Internet. Front-end order risk module 702 may comprise a portion of a software application that allows traders to interact with trading engines. A calculation module 704 functions in a manner similar to calculation module 306. Front-end order risk module 702 allows traders to manage risks associated with resting orders placed at a plurality of trading engines. For example, the trader may provide order risk data to trading engines 706 and 708. An order risk data database 710 may be included to calculate and track order risk data that has been provided to trading engine 706 and trading engine 708.

An offset module 712 may be used to distribute risks among two or more trading engines. For example, the current utilization of an order risk parameter at trading engine 706 is equal to the utilization threshold. As a result, no additional contracts will be executed at trading engine 706. However, the current utilization of the order risk parameter at trading engine 708 is below the utilization threshold. Based on this information, offset module 712 may transmit offset value 714 to trading engine 706 to allow trading engine 706 to execute additional contracts. The use of offset 714 allows the trader to continue conducting transactions while ensuring that the combined utilization threshold is not exceeded. The front-end order risk module 702 may prompt the trader to enter offset values. Additionally or alternatively, offset module 712 includes computer-executable instructions that generate offset values to transmit to trading engines based on the current utilization at the relevant trading engines.

In a distributed trading environment, there is a "many-to-many" relationship between the number of traders and the number of trading engines being traded on. Each trading engine has a particular capacity of trades that it is able to process, depending on a number of factors, including space and connectivity. In this relationship, there is a routing mechanism to deliver trades to the correct engine, but there is typically limited to no communication between engines to confirm what the trader may be doing in other markets and utilizing other trading engines. It is also contemplated, however, that the individual trading engines are not required to check with the credit control module to determine that the user does not exceed the user's available credit. In this way, credit aggregation may be performed out-of-band, with communication back to each of the trading engines that allow for enforcement of controls in-line to the trading activity. Thus, each trading engine may act on its own to determine whether the trader is engaging in proper trading activity. Additionally or alternatively, each of the trading engines may communicate with each other utilizing another module (besides the credit control module) to make determinations as to the trading activity.

Embodiments in accordance with the present invention provide credit control monitoring across any number of engine instances without adding or introducing significant performance or scalability limitations. A credit control module may provide asynchronous monitoring (e.g., out of band) and management of credit controls with communication back to the order routing mechanism or trading engine to confirm current thresholds, any credit control events or other in-line controls. Additionally, credit controls may be embedded within order routing modules, exposed for trade submission of bilaterally negotiated trades, and/or deployed to support the credit checking of third party matching platforms.

Credit control events include events that are related to risk parameters and can be asynchronous (e.g., out-of-band) or in line (e.g., in-band). Credit control events may include characteristics associated with an order, such as contract terms, number of trades, types of options, number of contracts, time order is placed, value of order and so on. Credit control events may also include characteristics associated with derivative risk parameters, such as delta, gamma and vega. In addition, credit control events may be based on properties of the contract, for example, a short term versus a long term contract. It is contemplated that credit control events can be based on any of the above or any combination of the above. It is further contemplated that a credit control module in accordance with the present invention may provide other in-line controls, such as the delta value of the aggregate trading.

Credit control events may include gross or net risk parameters and limits therein. For example, there are those orders which may add risk to a trader's portfolio or subtract risk from the trader's portfolio. A trader's gross trading may be calculated by aggregating the number of contracts. If a trader were to place five different orders for five contracts each, the gross of the trader would be twenty-five. In contrast, it is contemplated that certain orders may subtract risk from the gross amount. If a trader were to place two different orders to buy five contracts and two different orders to sell five contracts (assuming that a sell order in this instance reduces risk), the trader's net risk parameter would be zero. Along these lines, the credit control events may be based off of other notional values, such as positions held or a profit versus loss analysis of a portfolio. By measuring these notional values, the overall risk parameter of the portfolio or the profit/loss of a position can be evaluated. Thus, it is contemplated that the risk parameters for use with the present invention can be customized for each trader or trading engine.

In an asynchronous credit control, extensions are provided to provide limited in-line processing in the order routing trading engine or post trade deal submission mechanism. Preferably, a maximum quantity definition is managed in the credit control component and communicated back to the order routing mechanism and trading engine components. The maximum quantity definition can be set to a maximum allowable credit value and is preferably modifiable by a firm or credit control module in order to reduce the maximum quantity that can be traded as the credit control limit is approached. As explained herein, it is contemplated that the maximum quantity definition is also applicable to the in-line credit control.

It is contemplated that once a pre-determined capacity of trading has been reached, the credit control module may cancel any risk increasing or remaining orders. Additionally or alternatively, once a pre-determined capacity of trading has been reached, the credit control module may request an increase in credit available from the order routing mechanism of one trading engine to the order routing mechanism of a second trading engine. In this way the credit control module manages the number of trades to ensure that the maximum allowable credit value is not exceeded. Furthermore, it is contemplated that the limiting or canceling of orders may be accomplished in the direction of the risk, so as to minimize risk where possible.

As explained herein, each trader has associated with that trader a specific amount of credit. It is contemplated that as used herein, the term trader applies to individuals, brokerage houses and other investment firms as well as computer generated orders or automated orders. It is contemplated that the term a trader as used herein can be any source that originates an order.

Figure 8:
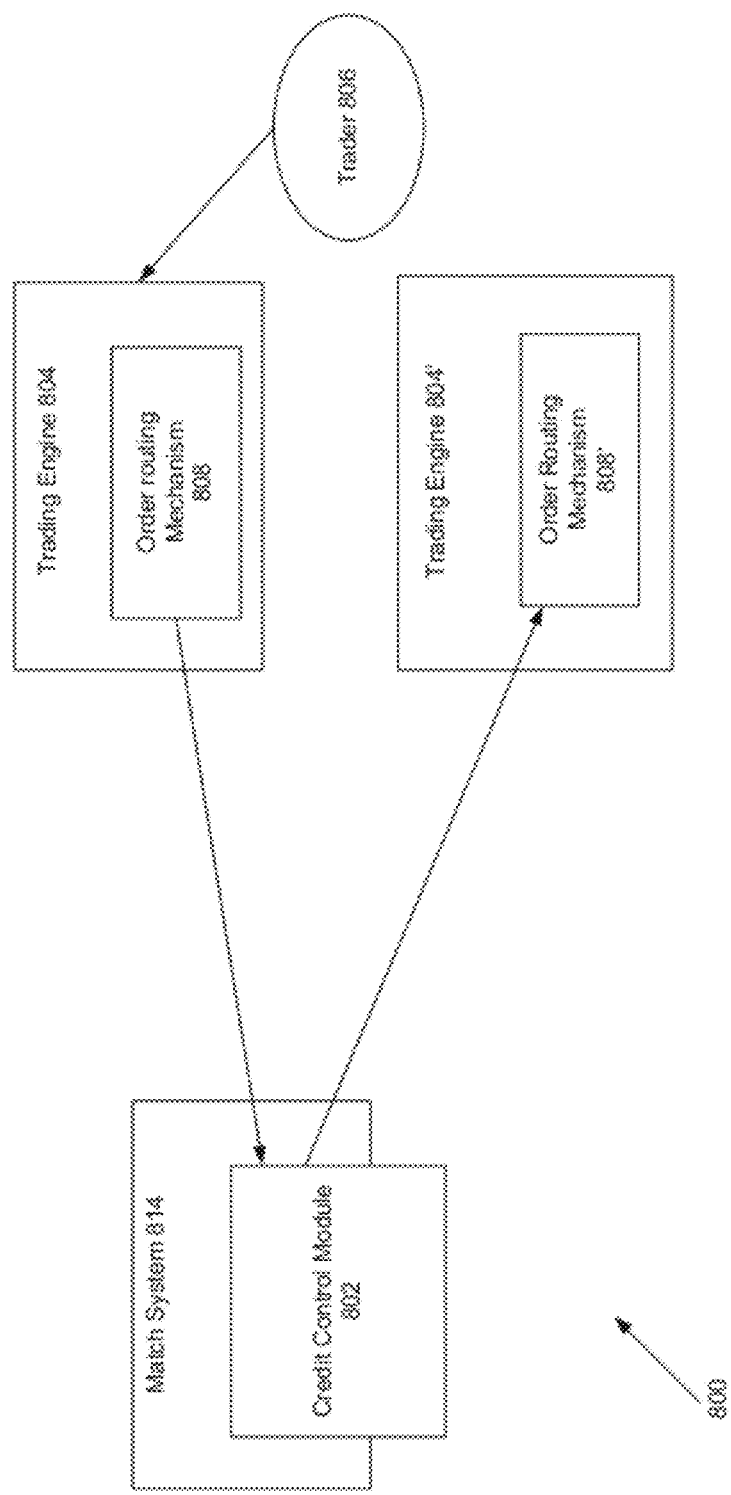
FIG. 8 illustrates a system used to manage risks associated with the volume of derivative product orders placed at a plurality of trading engines.

As shown in FIG. 8, an asynchronous embodiment in accordance with the teachings of the present invention is shown. In the asynchronous system 800, the credit control module 802, which is executing on a processor of a computing device, monitors the current thresholds. The threshold may be monitored to ensure that a maximum number of orders and trades are not exceeded by a trading engine 804. The credit control module 802 may receive a feed (e.g., near realtime or realtime) with trade and/or order information associated with one or more exchanges. The credit control module 802 may use this out-of-band information to generate an enforcement message. The out-of-band information is useful to manage the credit associated with a submitted order.

It is contemplated that the credit control module 802 may be located in any of numerous locations. In one embodiment, the credit control module 802 may be located on the front end (e.g., at a trader's 806 terminal). In another embodiment, the credit control module 802 may be located on the back end (e.g., clearinghouse 140 or clearing firm site). It is further contemplated that the credit control module 802 may be a unitary part of the match system 814. For example, the credit control module 802 may be a part of the match system 814 to process the trade order that is placed. A trader 806 places a trade through the trading engine 804, which relays the trade through the order routing mechanism 808 to an interface at the match system 814 or credit control module 802 to receive the order. The credit control module 802 relays information regarding the trader 806 and identifies which trading engine 804 the trade is being placed through.

Each trading engine 804 also may include information that is associated with that trading engine 804. For example, each trading engine 804 may include information about the location of the engine, the trading history of the engine, an index of derivative products traded, and/or a trading volume capacity, etc. The trading engine 804 may include information regarding the maximum number of trades, or trading capacity, that the engine is capable of handling. This information can be communicated to the credit control module 802 through the order routing mechanism 808 at anytime during the process of placing the trade: before, during or after. In one embodiment, the credit control module 802 may receive this information and process it before execution of the order is permitted. In an alternate embodiment, this information may be communicated anytime during the process of placing the trade. The credit control module 802 may determine the number and value of trades each trading engine 804 is attempting to place while the trades are being placed. At the same time, the credit control module 802 is communicating with the order routing mechanism 808 and may determine the trading volume capacity of the trading engine 804.

If the number and/or value of trades being placed through the order routing mechanism 808 exceeds the maximum defined credit value, the credit control module 802 can request a credit increase for the trades from another trading engine 804' via another order routing mechanism 808'. It is contemplated that the credit control module 802 will begin to request an increase in credit from another trading engine once a certain percentage of the maximum trading volume is being approached. In one example, if the amount of trades reaches 98% of the maximum trading volume of the trading engine 804, the credit control module 802 will begin to request credit from the order routing mechanism 808 of one trading engine 804 to the order routing mechanism 808' of a another trading engine 804'. Those of ordinary skill would appreciate the pre-determined level to begin requesting credit from one trading engine to another.

Additionally or alternatively, when the credit control module 802 requests a credit increase to a second trading engine due to the over-capacity of a first trading engine, the maximum trading value capacity of the second trading engine is checked. Should the second trading engine also be at a pre-determined level of the maximum trading value of the second trading engine, the credit control module 802 may request an increase in credit from a third trading engine. It is contemplated that each trading engine may have different maximum trading value capacities, although some or all may have the same. In this way, the credit control module 802 will continue to request a credit increase from a first trading engine until a trading engine is reached that is not at the pre-determined level of maximum trading value capacity and then the trade can be placed through the order routing mechanism of that trading engine.

In another embodiment in accordance with the present invention, a credit control module provides monitoring and management of credit controls with communication to each trading engine to act as a bank to manage the available credit. In this way, the credit controls can be managed in-line with the credit control module, which can manage where to add or subtract credit.

Figure 9:
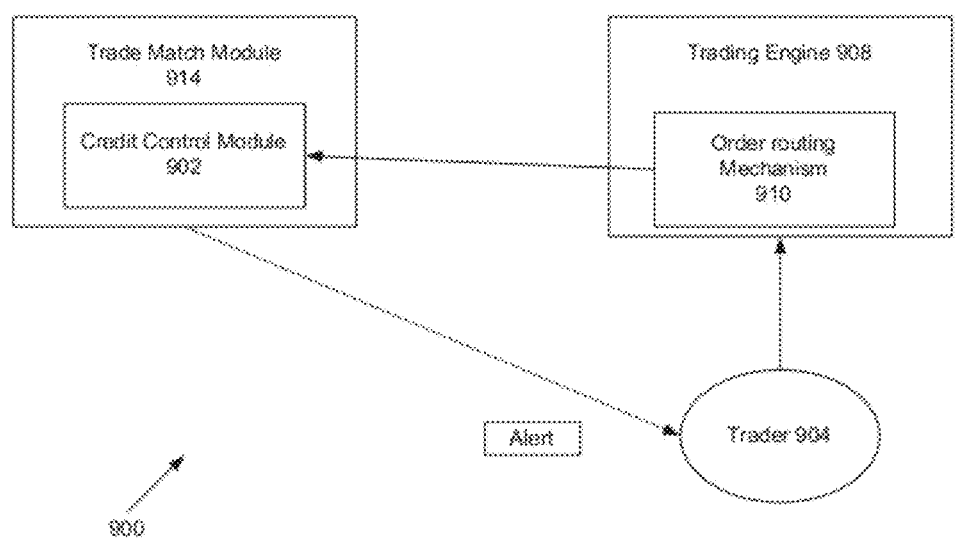
FIG. 9 illustrates a system used to manage risks associated with the credit of a trader placing derivative product orders at a plurality of trading engines.

As shown in FIG. 9, an embodiment illustrating how a credit control module can provide monitoring and management to act as a bank to manage available credit that is provided. This embodiment of the invention shows a banking system 900 wherein the credit control module 902 monitors and manages the credit capacity of a trader 904. The trader 904 places a desired trade order on the front-end of the system. In particular, the trader 904 interacts with a trading engine 908 to place a desired trade. The trade information for the desired trade is then sent to the order routing mechanism 910, which in turn communicates the trade information from the front-end to the trade match module 914. The trade match module 914 may be located at the back end (e.g., clearinghouse 140), front-end, a combination thereof, or another location. The trade information is sent through an interface to the trade match module 914 to the credit control module 902. The trade is not placed into the trade match module 914 until provided acceptance from the credit control module 902.

Furthermore, the credit control module 902 may receive, in some embodiments in accordance with aspects of the disclosure, a near real-time feed of outbound data. The outbound data may include, among other things, copies of orders and trades being executed. The outbound data may be sent out-of-band to prevent bandwidth/latency issues with in-band data, and to avoid interruptions of order flow. The out-of-band feed may be used by the credit control module 902 to process risk in a near real-time manner to track trading activity (e.g., by a trader 904 using a trading engine 908). The credit control module 902 may aggregate data from one or more exchanges and/or clearinghouses and be able to provide a more robust monitoring. In an alternate embodiment, aggregation may be performed out-of-band, with communication back to each of the trading engines. Thus, each trading engine 904 may act on its own to communicate with each other, independent of a credit control module 902, to determine whether the trader is engaging in proper trading activity. The out-of-band aggregation may occur at the backend (e.g., clearinghouse 140), at the exchange 100, or a different location (e.g., by a third-party entity responsible for aggregation and/or distribution).

The credit control module 902 may implement one or more business rules based on predefined thresholds or tolerances of risk. For example, when SPAN portfolio risk exceeds a limit, the credit control module 902 may take action to reduce risk. In another example, if the true profit and loss monitoring detects that a trader has lost more than a particular amount of money, then an enforcement message may be sent to reduce risk. In yet another example, the credit control module 902 may send an enforcement message if a certain amount of delta is exceeded. That enforcement message may indicate that options trading is cutoff.

The credit control module 902, with assistance from a number of other modules, may generate an enforcement message for transmission to a clearinghouse 140 or exchange computer system 100, as explained above. The enforcement message may cause the clearinghouse 140 or exchange computer system 100 to prevent further trading by a particular trader 904 and/or trading engine 908. The enforcement message may halt trading of a particular product or by particular traders by, inter alia, sending an enforcement message defining a maximum clip size (i.e., maximum number of lots to be traded) of zero, thus, cutting off trading. In other embodiments in accordance with aspects of the disclosure, the maximum clip size may be set to values other than zero (e.g., 1, 10, 50, 100, etc.) In some embodiments, other values may be set for bids or offers to prevent accumulating risk in one direction while allowing orders and/or trades that reduce risk.

In some embodiments, the risk may be calculated based on a specific product or aggregated across products for a specific trader 904, group of traders (e.g., all traders at a particular division of a trading firm), or a trading firm. For example, a product may be defined, in some examples, by a specific contract and/or maturity group, group of contracts, generic products, asset classes, exchange, or other characteristic. Meanwhile, entities (e.g., groups of traders, firms, etc.) may be defined by account number, specific trader, firm, trading connection, or other characteristic. The enforcement message may be customized to indicate specifically what product or entity will operate under reduced or halted trading. At least one benefit of such customization is that the credit control module 902 may more precisely restrict trading when a risk has been identified. In some embodiments, a single enforcement message may include multiple separate enforcement messages. For example, a batch enforcement message may halt bids for particular products and also reduce trading for a particular entity.

Each trader 904 has associated with it trader information. Included in the trader information is a total credit parameter which may include a maximum credit value. Once the order is sent from the trader 904 on the front-end, the credit control module 902 reviews the maximum credit value for the trader 904. If the value of the desired trade being placed is less than the maximum credit value associated with the trader, the credit control module 902 will allow the trade to proceed to the trade match module 914 for execution. If, on the other hand, the value of the desired trade being placed is greater than the maximum credit value associated with the trader 904, then the credit control module 902 can stop the trade from execution by not allowing the trade to proceed to the trade match module 914.

In addition, the credit control module 902 can stop a particular trade from being executed if it is approaching the traders 904 maximum credit value. If the trader 904 has attained a certain (typically predetermined) percentage of his/her maximum credit value, the credit control module 902 can stop the trade from being executed. Alternatively, the credit control module 902 can send an alert to the trader 904, informing the trader 904 that the maximum credit value is approaching. Still alternatively, the credit control module 904 may do any combination of allowing the trade to proceed to the trade match module 914, halting the trade and alerting the trader.

The credit control module may also or alternatively monitor the number of trades of each trading engine and also act as a bank and manage the credit of a trader, as described above. In certain embodiments, if a trader places a trade through the trading engine, the credit control module will check to make sure that trader has enough available credit to make the trade and also that the trading engine has the capacity to fill the requested volume of the trade. If the trader has enough credit but the trading engine does not have the volume capacity, the credit control module requests a credit increase for the trading engine by requesting a credit increase from the available credit of another trading engine as described above.

Conventional electronic trading systems providing in-line (e.g., pre-trade) credit control do not allow aggregation of positions at multiple venues (e.g., over the counter (OTC), call around, and Swap Execution Facility (SEF) Request for Quote (RFQ) trading models, etc.).

In another example embodiment, a distributed credit control system is disclosed that provides in-line credit control across multiple node servers that report to and may be controlled by a management server. The management server may allocate credit to distributed node servers and may aggregate positions of one or more trading entities generated by the different node servers. For example, a trading entity may trade various types of financial instruments, including one or more of, for example, futures, options, stocks, bonds, over the counter (OTC) products, interest rate swaps (IRS), credit default swaps (CDS), equities, central limit orders, FX products, central limit order book traded orders, bilaterally negotiated centrally cleared orders, other types of financial instruments, and combinations thereof, etc. The node servers may employ credit control algorithms that vary based on credit utilization and speed of trading. The management server may monitor aggregate credit utilization based on data provided by the node servers.

Figure 10:
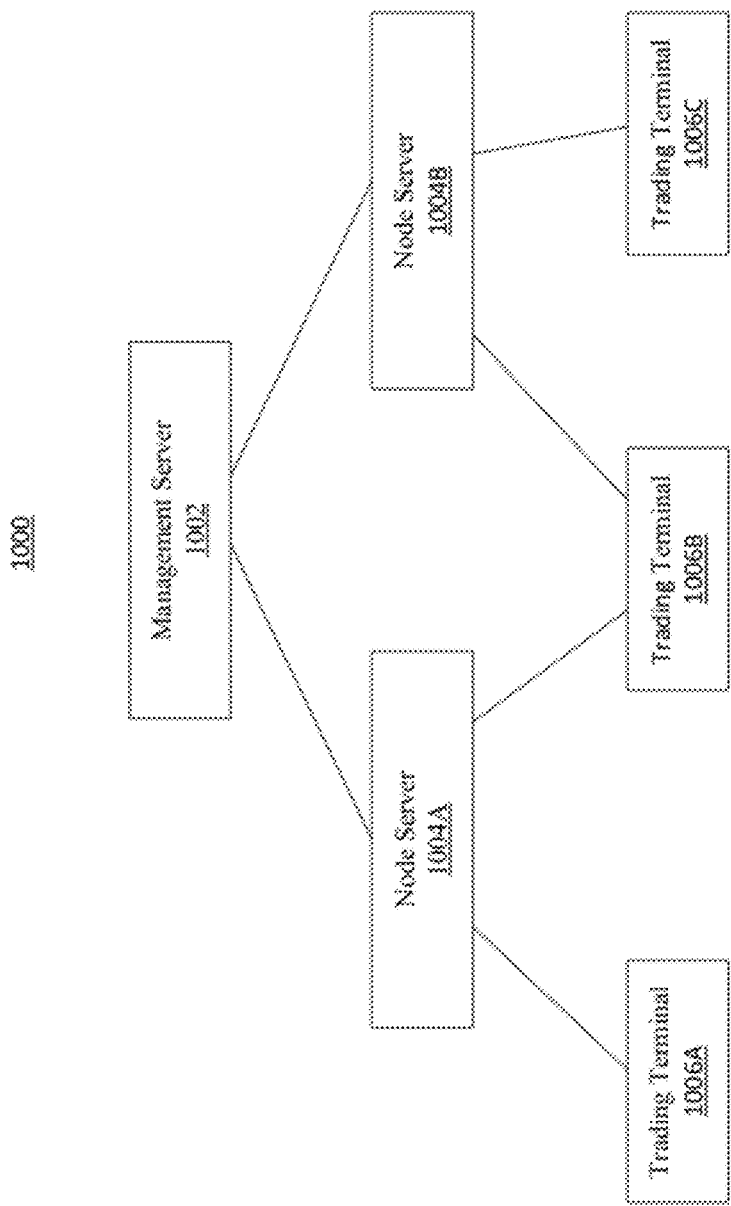
FIG. 10 illustrates an example distributed credit control system in accordance with example embodiments.

FIG. 10 illustrates an example distributed credit control system 1000 in accordance with example embodiments. Distributed credit control system 1000 may include a management server 1002, one or more node servers 1004A-B, and one or more trading terminals 1006A-C associated with one or more trading entities. A trading entity may be an individual trader, a trading firm, or other trading organization. The components in distributed credit control system 1000 are shown connected by lines, which may reflect a direct link or may represent a network between components. Further, system 1000 may include more or fewer instances of the depicted components, as well as additional components that are not depicted.

For each of multiple trading entities, management server 1002 may manage aggregated positions of each trading entity, monitor a portfolio of trades associated with each trading entity, monitor credit utilization of each trading entity relative to an aggregate credit limit, prices associated with pending orders, prices associated with executed trades, and may allocate credit to one or more node servers 1004A-B for local authorization to execute orders and/or trades. In an example, management server 1002 may be a computer providing enterprise credit controls.

Management server 1002 and node servers 1004 may provide credit controls for execution of orders and/or trades. An order may be a financial instrument submitted to a matching engine for at least partially matching with another order. For example, a sell order may be matched with a buy order at a particular price. A trade may be a bilateral agreement reached between two or more parties and sent to a clearing house for clearing. Management server 1002 and node servers 1004 may provide credit controls regardless of whether associated with an order or trade. The following discussion refers to orders in some instances and trades in other instances, but is applicable to both. Credit controls discussed herein may also be applied at various times, including, for example, (1) pre-submission of an order, (2) post submission of an order, pre-execution of a trade, and (3) post execution of a deal, pre-acceptance of clearing.

For each of multiple trading entities, a node server 1004 may calculate credit utilization of each trading entity relative to an amount of credit allocated by the management server 1002, and enforce credit limits based on the allocated amount of credit. Node server 1004 may also communicate credit information to the management server 1002 before or after execution of a trade and/or order. Credit information may include portfolio data specifying one or more of trading positions, prices associated with an order and/or trade, and as well as credit utilization data indicating credit utilization for each of the trading entities. In some instances, node server 1004 may locally authorize execution of a requested order or trade independent of management server 1002.

Node server 1004 may be implemented at an order entry gateway, a match engine, a post trade block facility, venue (e.g., Over the Counter (OTC), Futures, Options, etc.), or other location where trading may occur. With reference to FIG. 1, node server 1004 may be implemented within exchange computer system 100, for example, as part of the match engine module 106 or the order books module 110. In other examples, node server 1004 may be implemented as part of trading engine 138 external to the exchange computer system 100. In a further example, node server 1004 may be implemented by a risk administrator that may be, for example, a clearing firm or a clearing house. Node server 1004 may also be implemented as a standalone system that is pinged for credit by, for example, an order entry gateway, a match engine, etc. For example, node server 1004 may be deployed locally at a swap execution facility (SEF), which may ping node server 1004 to determine if an order can be executed and/or trade can be cleared based on a trading entity's current credit utilization.

In some examples, node server 1004 may be located geographically closer to a trading terminal 1006 than management server 1002. For example, node servers 1004 may be located at order entry gateways (e.g., Think, SEF Gateway) or trade submission interfaces (e.g., ClearPort). To satisfy low-latency requirements, system 100 advantageously may, in some examples, perform credit calculations geographically nearest to where a trade or order request originates (e.g., closest to the customer) and may, in some examples, provide pre-trade credit checks. In other examples, node server 1004 may perform a synchronous check with management server 1002 before authorizing a trade.

Each of the management server 1002, node servers 1004, and trading terminals 1006 may include at least one memory and/or at least one non-transitory computer readable memory storing executable instructions and at least one processor. The at least one processor may execute the executable instructions to cause performance of operations described herein respectively attributed to the management server 1002, node servers 1004, and trading terminals 1006.

In an example, system 1000 may implement multiple credit control algorithms at various locations. Some credit control algorithms may be executed by management server 1002, while others may be executed by one or more of node servers 1004A-B. The credit control algorithms may be used to confirm that a trading entity has sufficient credit prior to execution of an order and/or a trade. In some examples, system 1000 may provide for synchronous credit control and for asynchronous credit control. For synchronous credit control, node server 1004 may communicate with management server 1002 when making credit utilization determinations prior to execution of every order and/or trade (or at least some orders and trades) to confirm that the order and/or trade would not exceed the aggregate credit limit of a trading entity.

For asynchronous credit control, node server 1004 may make at least some credit utilization determinations independent of management server 1002, and may communicate credit information (e.g., credit utilization, underlying positions, prices, etc.), to management server 1002, subsequent to execution of one or more orders and/or trades requested by a trading entity. In an example, node server 1004 may communicate credit information to management server 1002 at pre-determined, aperiodic, or random time intervals (e.g., once every n milliseconds), upon identifying a particular event (e.g., every $2^{nd}$ trade), or at predetermined check points (e.g., threshold percentage of credit has been utilized). A customer, trading entity, clearing firm, risk administrator, or other organization may also specify how frequently credit information is communicated by node server 1004 to management server 1002. Asynchronous credit control may advantageously reduce latency in trade and/or order execution due to node server 1004 not having to obtain permission from management server 1002 prior to execution of every order or trade.

As part of asynchronous credit control, management server 1002 may allocate a certain amount of credit for a particular trading entity to multiple node servers 1004A-B. In an example, management server 1002 may initially allocate credit based on historical usage of credit by the trading entity at a particular node server 1004, based on an amount of credit the trading entity requests to be allocated at a particular node server 1004, or based on a configurable parameter specified by a risk administrator (e.g., clearing firm). In one example, node servers 1004A-B may communicate historical credit usage by a trading entity to management server 1002 for determining initial allocation of credit. The amount of credit allocated to one node server 1004 may be different than the amount of credit allocated to another node server 1004.

Node servers 1004A-B may use the allocated credit as a limit when determining whether to permit execution of a trade requested by a trading entity. If an order or proposed trade would not cause a trading entity to exceed an allocated credit limit, node server 1004 may permit the order or trade to be executed without requiring authorization by the management server 1002. If an order or proposed trade would exceed the allocated credit limit, a node server 1004 may prevent execution of the order or trade, or may request an additional allocation of credit from the management server 1002. Management server 1002 may either allocate additional credit by reducing an amount of credit allocated to a different node server, or may deny the request for additional credit. For example, management server 1002 may reduce an amount of credit available at node server 1004B by a first amount and may increase an amount of credit available by node server 1004A by a second amount. The first and second amounts may be the same or may differ. Increasing credit at one node server and decreasing credit at another node server may be referred to as providing an offset. Node server 1004A may then permit execution of a trade in view of the newly allocated credit, or may deny execution of the trade if no additional credit is allocated. Further, whether additional credit is allocated may be a configurable parameter specified by a customer, trading entity, risk administrator, clearing firm, or other organization. Instead of requesting additional credit from a node server 1004B, the configurable parameter may instruct node server 1004A that orders/trades associated with insufficient credit are rejected or held for a predetermined time to await if additional credit becomes available at node server 1004A.

Node server 1004 may also request additional credit when a trading entity is approaching their allocated credit limit. In an example, node server 1004A may determine that a trading entity is approaching their allocated credit limit when credit utilization reaches a predetermined percentage of the allocated credit limit (e.g., 90%) or when the projected usage of credit will exceed a defined percentage within a configurable timeframe.

To further control latency in execution of a requested order and/or trade, node servers 1004 may locally execute credit calculations employing credit control algorithms having different granularities. In an example, node servers 1004A-B may apply either a coarse precision algorithm, a fine precision algorithm, or both. The coarse precision algorithm may approximate an amount of credit utilization by a trading entity. The fine precision algorithm may more accurately determine an amount of credit utilization by a trading entity, and in some examples may determine the exact amount of credit utilization by the trading entity. The coarse precision algorithm may be executed more quickly, but may be a less accurate determination of credit utilization, than the fine precision algorithm. For example, the coarse precision algorithm may be a linear approximation. In a value at risk (VAR) example, the fine precision algorithm may make a VAR calculation on every order and/or trade, and the coarse precision algorithm may be a Taylor approximation for a given order and/or trade. In a Standard Portfolio Analysis of Risk (SPAN) example, the fine precision algorithm may calculate risk arrays for long/short exposure, and the coarse precision algorithm may increment or decrement previously calculated worst case long/short exposures for a current order and/or trade. In yet another example, the fine precision algorithm may perform SPAN, VAR, Historical VAR (HVAR), etc., analysis on every order and/or trade, and the coarse precision algorithm may use position limits.

Node server 1004 may apply the coarse precision algorithm when a trading entity's current credit utilization is less than a credit threshold to permit faster execution of trades. The credit threshold may be a predetermined amount of a credit limit of a trading entity that has been allocated to the node server 1004 (e.g., 80% of allocated credit limit). In an example, the coarse precision algorithm may be used for high-frequency trading to permit faster execution of trades. Node server 1004 may also run two or more threads for executing operations associated with asynchronous control, synchronous control, the coarse precision algorithm, and the fine precision algorithm. For example, node server 1004 may be an order entry gateway that uses a first thread to execute operations to provide asynchronous control for coarse grained, a second thread to provide asynchronous control for fine grained, a third thread to execute operations to provide synchronous control for fine grained, and a fourth thread to provide synchronous control for coarse grained algorithm. Using multiple threads advantageously may permit concurrent execution of operations for asynchronous control, synchronous control, the coarse precision algorithm, and the fine precision algorithm. Thus, a thread executing the coarse precision algorithm may not have to wait, before starting execution, for completion of execution of the thread associated with the fine precision algorithm. In comparison, when using only a single thread, that thread may execute operations on a first come, first served basis. For example, when the single thread starts execution of a fine precision algorithm, that thread may not begin executing a coarse precision algorithm until completing the fine precision algorithm, thus delaying execution of the coarse precision algorithm, particularly for synchronous calculations.

When a trade request is received from a trading entity, node server 1004 may compare a current credit utilization of the trading entity to a credit threshold to control whether to use the coarse precision algorithm or the fine precision algorithm. In some examples, node server 1004 may initially use the coarse precision algorithm to determine current credit utilization of a trading entity until credit utilization of the trading entity meets or exceeds the credit threshold. At that time, node server 1004 may then use the fine precision algorithm to more accurately determine credit utilization of the trading entity. If node server 1004 subsequently determines that the credit utilization of the trading entity falls below the credit threshold, node server 1004 may resume using the coarse precision algorithm. The management server 1002 may also control which of a fine or coarse precision algorithm the node server 1004 is using, for example, instructing the node server 1004 to change from using a coarse precision algorithm to a fine precision algorithm.

In example embodiments, for orders and/or trades that occur infrequently and where fast execution may be less important than credit utilization, node server 1004 may primarily use fine precision algorithms to calculate credit utilization, and may infrequently or never use coarse precision algorithms to calculate credit utilization. Alternatively or additionally, when a request for such an order and/or trade is received, node server 1004 may also check with management server 1002 to verify sufficient credit based on aggregate credit utilization. As an example, a fine precision algorithm may perform a full Value at Risk (VAR) and Profit and Loss (P&L) check for such trades (e.g., ClearPort).

Figure 11:
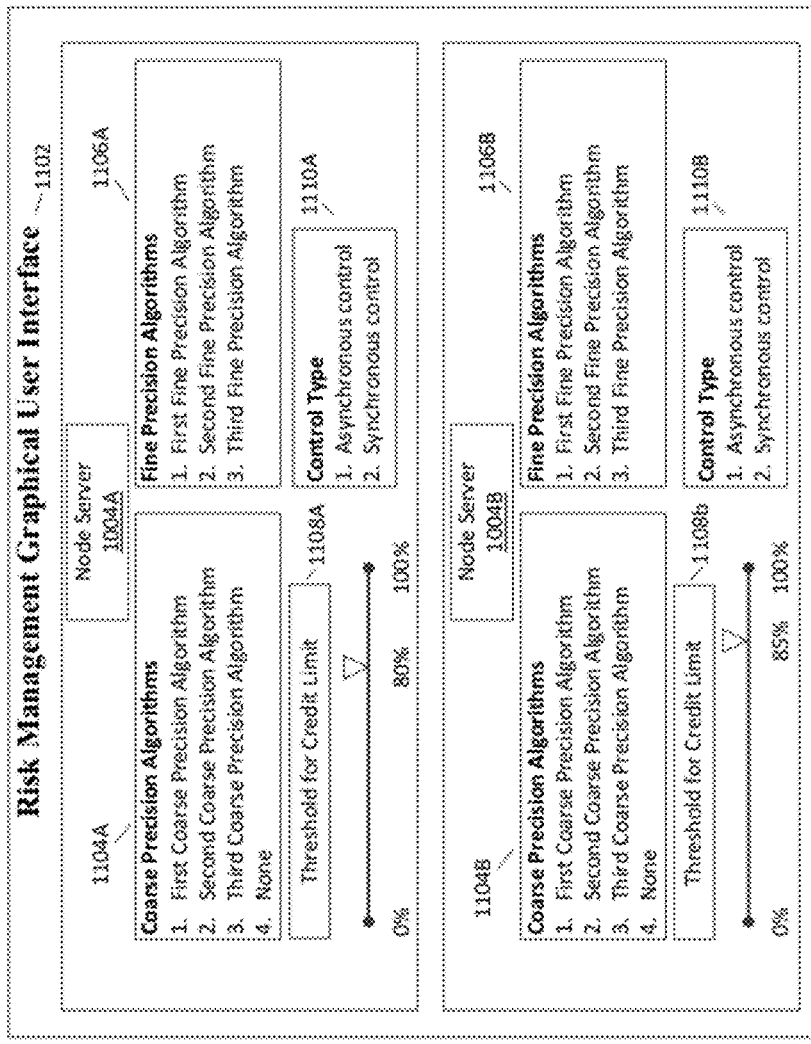
FIG. 11 illustrates a risk management graphical user interface (GUI) in accordance with example embodiments.

Distributed credit control system 1000 may permit a risk administrator to specify which credit control algorithms are used for determining credit utilization. FIG. 11 illustrates a risk management graphical user interface (GUI) 1102 in accordance with example embodiments. Distributed credit control system 1000 may provide data for the risk management GUI 1102 for presentation at a computer, smart phone, or other device of a risk administrator. Risk management GUI 1102 may present Fields 1104A-B permitting selection of one or more coarse precisions algorithms, as well as Fields 1106A-B permitting selection of one or more fine precision algorithms. If a risk administrator only wants a fine precision algorithm for determining credit utilization, a risk administrator may select 'none' in field 1104A or 1104B.

Risk management GUI 1102 may include Fields 1108A-B permitting a risk administrator to select a credit threshold to control when node servers 1004A-B apply a fine precision algorithm instead of a coarse precision algorithm. In an example, a risk administrator may adjust a percentage using a sliding scale between 0% and 100% for the credit threshold, as depicted in Fields 1108A and 1108B. Risk management GUI 1102 may include Fields 1110A-B permitting a risk administrator to specify a control type. For example, control types may include asynchronous control and synchronous control, as discussed above.

Fields 1104A, 1106A, 1108A, and 1110A of risk management GUI 1102 may correspond to credit controls associated with node server 1104A, and fields 1104B, 1106B, 1108B, and 1110B may correspond to credit controls associated with node server 1104B. Risk management GUI 1102 may include additional fields to provide selections similar to that available in Fields 1104, 1106, and 1110 for one or more additional node servers 1004. Risk administrator may also update the inputs to Fields 1104, 1106, and 1110 provided via risk management GUI 1102, and management server 1002 may communicate updated to the affected node servers 1104.

Once a risk administrator has made desired selections in risk management GUI 1102, management server 1002 may inform the node servers 1002 of the selections (e.g., in real-time). In an example, management server 1002 may communicate at least one instruction (e.g., in real-time) to the node servers 1004A-B based on input received via risk management GUI 1102. For instance, management server 1002 may communicate one or more instructions that instruct node server 1004A to only use a particular fine precision algorithm, and not a coarse precision algorithm, in determining credit utilization of trading entities associated with a particular risk administrator. Management server 1002 may also instruct node server 1004B to use a particular coarse precision algorithm until reaching a particular credit threshold, and, after credit utilization meets or exceeds the credit threshold, to use a particular fine precision algorithm. Management server 1002 may further instruct the node server 1004B to resume using the particular coarse precision algorithm upon determining that credit utilization of the trading entity falls below the particular credit threshold.

Management server 1002 may perform credit calculations, instead of or in addition to the credit calculations performed by the node servers 1004A-B. For example, management server 1002 may perform credit calculations to monitor aggregate positions of each trading entity across multiple node servers 1004A-B. For example, aggregation may be of positions in one or more accounts, associated with one or more traders, associated with one or more trading firms, associated with one or more clearing firms, and any combination thereof. The aggregation of risk across nodes may result in offsets thereby resulting in reduced credit utilization across node servers.

Node servers 1004A-B may occasionally or periodically communicate, to management server 1002, credit information including portfolio data and/or credit utilization data on orders and/or trades executed by each trading entity. Portfolio data may include each of the executed trades associated with a particular trading entity, underlying positions, prices, etc., and node servers 1004A-B may send portfolio data on each of the trading entities to the management server 1002. The management server 1002 may also load start of day positions and transmit the positions to node servers 1004.

For a particular trading entity, management server 1002 may aggregate the portfolio data and aggregate the credit utilization data received from one or more node servers 1004A-B to determine aggregate portfolio data and aggregate credit utilization data of the particular trading entity. From the portfolio data, management server 1002 may determine credit utilization by the particular trading entity at each of the node servers 1004A-B, and compare credit utilization to allocated credit limits at each of the node servers 1004A-B. To do so, management server 1002 may apply a fine precision algorithm to the portfolio data received from each of the node servers 1004 to determine credit utilization for each of the trading entities, and may compare the credit utilization at a particular node server 1004 to an allocated credit limit. In an example, management server 1002 may determine that the particular trading entity has utilized 98% of their allocated credit limit at node server 1004A and 25% of their allocated credit limit at node server 1004B.

Management server 1002 may use the percentages of credit utilization at the individual node servers to automatically and dynamically reallocate credit between the node servers. For instance, management server 1002 may determine that a credit utilization percentage at node server exceeds a reallocation threshold. Continuing the above example, management server 1002 may set a reallocation threshold at 90% credit utilization. Upon determining that 98% of the allocated credit limit has been utilized at node server 1004A, management server 1002 may increase the amount of allocated credit at node server 1004A and also decrease the amount of allocated credit at node server 1004B by a corresponding or differing amount. Automatically reallocating credit may permit both node servers 1004A and 1004B to use coarse precision algorithms, rather than fine precision algorithms, potentially resulting in faster order and/or trade execution while maintaining the trading entity within an aggregate credit limit.

Figure 12:
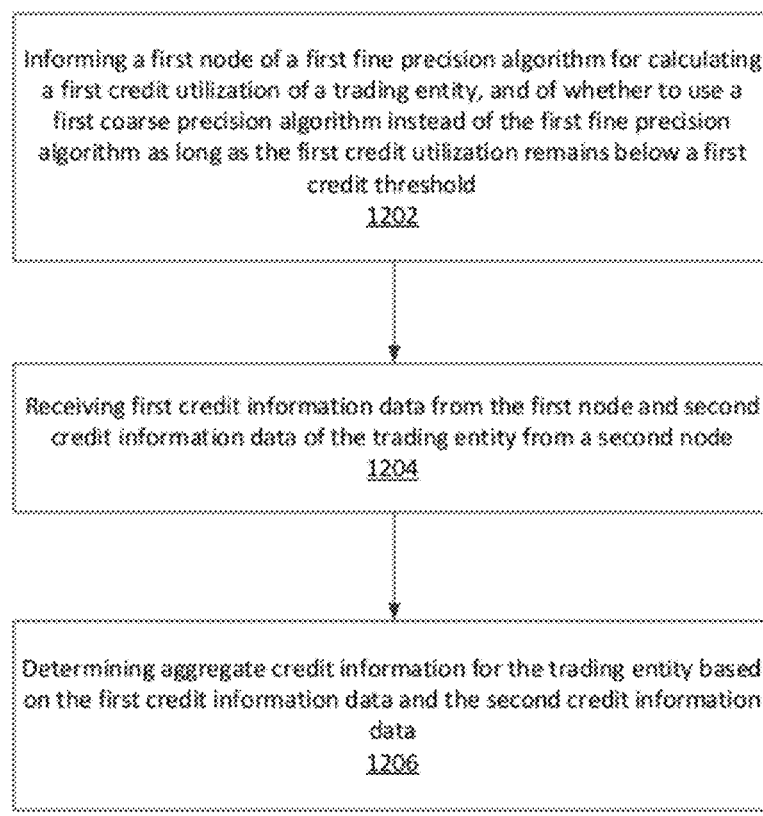
FIG. 12 illustrates an example flow diagram of a method for determining aggregate credit information associated with a trading entity, in accordance with example embodiments.

FIG. 12 illustrates an example flow diagram of a method for determining aggregate credit information associated with a trading entity, in accordance with example embodiments. The method may be implemented by a single apparatus such as, for example, management server 1002, a computer, a server, or other computational device. The method may also be distributed and the method may be performed by two or more devices, with each performing certain steps. The method may also be stored on a non-transitory and/or tangible computer readable medium as computer executable instructions. The order of the blocks shown in FIG. 12 is an example. The blocks may be arranged in other orders, each function described in each block may be performed one or more times, some blocks may be omitted, and/or additional blocks may be added. The method may begin at block 1202.

In block 1202, the method may include informing a first node of a first fine precision algorithm for calculating a first credit utilization of a trading entity, and of whether to use a first coarse precision algorithm instead of the first fine precision algorithm as long as the first credit utilization remains below a first credit threshold. In an example, management server 1002 may inform each of the node servers 1004A-B of which algorithms to use when making credit utilization determinations for trading entities. Some risk administrators may desire to have all credit utilization determinations made using a fine precision algorithm, even if there may be some delay in executing a requested trade. Other risk administrators may desire to have a node server 1004 use a coarse precision algorithm to approximate the trading entity's credit utilization until determining that credit utilization of the trading entity meets or exceeds a credit threshold. Upon being exceeded, node server 1004 may make subsequent credit utilization determinations using the fine precision algorithm to more accurately determine the trading entity's credit utilization. Over time, node server 1004 may determine, using the fine precision algorithm, that the trading entity's credit utilization has fallen below the credit threshold. Thereafter, node server 1004 may resume making credit utilization determinations using the course precision algorithm as long as the trading entity's credit utilization remains below the credit threshold. For other node servers, management server 1002 may similarly inform at least one other node server of a fine precision algorithm and of whether to apply a coarse precision algorithm for determining credit utilization of the trading entity.

In block 1204, the method may include receiving first credit information data from the first node and second credit information data of the trading entity from a second node. In an example, management server 1002 may receive data on credit utilization, as well as portfolio data, of a trading entity from one or more node servers 1004A-B.

In block 1206, the method may include determining aggregate credit information data for the trading entity based on the first credit information data and the second credit information data. In an example, management server 1002 may determine aggregate credit utilization for the trading entity based on the credit information data received from the one or more node servers 1004A-B. Management server 1002 may use the aggregate credit utilization to confirm that the trading entity is within an aggregate credit limit. Management server 1002 may also generate the aggregate credit information data based on received portfolio data from node servers 1004A-B for confirming calculations made by node servers 1004A-B.

In some examples, management server 1002 may dynamically reallocate credit between the node servers 1004A-B based on a trading entity's current credit utilization at the node servers 1004A-B. For example, reallocation may be used to permit as many of the node servers 1004A-B to use coarse precision algorithms rather than fine precision algorithms. This may advantageously result in faster execution of trades by a trading entity. Management server 1002, however, may not instruct a node server 1004 to use a coarse precision algorithm contrary to a risk administrator's instruction to only use a fine precision algorithm at the node server 1004. The method of FIG. 12 may end, may repeat one or more times, or may return to any of the preceding blocks.

Figure 13:
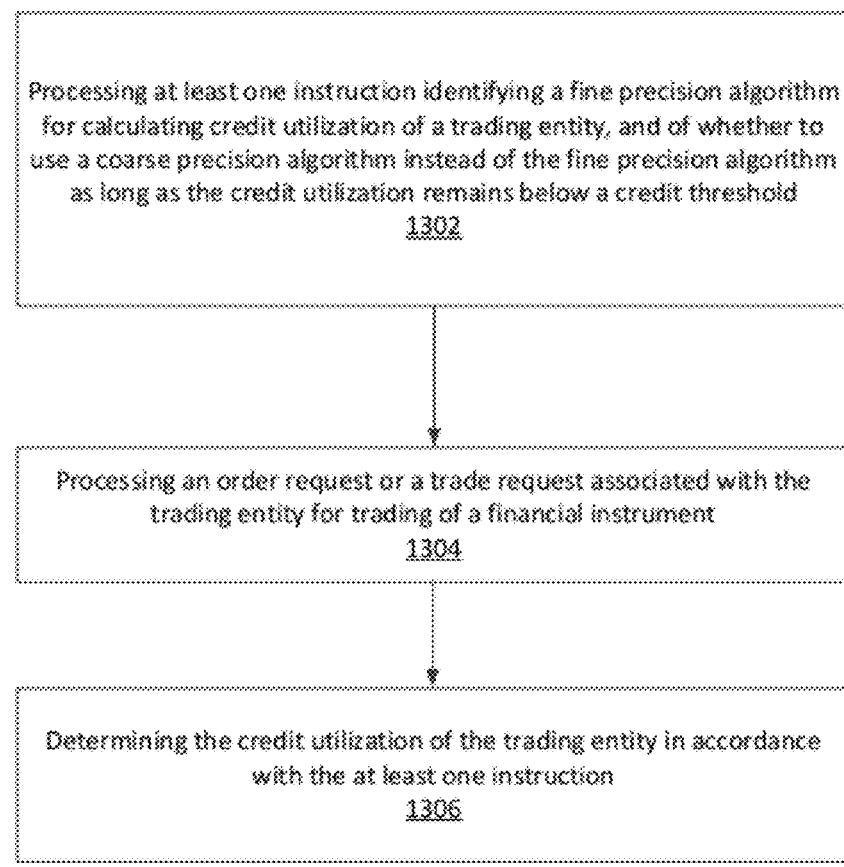
FIG. 13 illustrates an example flow diagram of a method for determining credit utilization of a trading entity, in accordance with example embodiments.

FIG. 13 illustrates an example flow diagram of a method for determining credit utilization of a trading entity, in accordance with example embodiments. The method may be implemented by a single apparatus such as, for example, a node server 1004, a computer, a server, or other computational device. The method may also be distributed and the method may be performed by two or more devices, with each performing certain steps. The method may also be stored on a non-transitory and/or tangible computer readable medium as computer executable instructions. The order of the blocks shown in FIG. 13 is an example. The blocks may be arranged in other orders, each function described in each block may be performed one or more times, some blocks may be omitted, and/or additional blocks may be added. The method may begin at block 1302.

In block 1302, the method may include processing at least one instruction identifying a fine precision algorithm for calculating credit utilization of a trading entity, and of whether to use a coarse precision algorithm instead of the fine precision algorithm as long as the credit utilization remains below a credit threshold. In an example, node server 1004 may receive at least one instruction from management server 1002. The at least one instruction may identify a fine precision algorithm that the node server 1004 is to use when determining credit utilization of a trading entity. The at least one instruction may also inform the node server 1004 of whether to use a coarse precision algorithm. In one example, the at least one instruction may instruct the node server 1004 only to use the fine precision algorithm when determining credit utilization of a trading entity, and not to use the coarse precision algorithm. In another example, the at least one instruction may instruct the node server 1004 to use the coarse precision algorithm until determining that a credit utilization of the trading entity meets or exceeds a credit threshold. At that point, the at least one instruction may instruct node server 1004 to use the fine precision algorithm, instead of the coarse precision algorithm, for determining credit utilization of a trading entity. The at least one instruction may instruct node server 1004 to return to using the coarse precision algorithm upon determining, using the fine precision algorithm, that the credit utilization of a trading entity no longer meets or exceeds the credit threshold.

In block 1304, the method may include processing an order request or a trade request associated with the trading entity for trading of a financial instrument. In an example, node server 1004 may receive a trade request from a trading entity for trading of one or more financial instruments.

In block 1306, the method may include determining the credit utilization of the trading entity in accordance with the at least one instruction. In an example, node server 1004 may determine a credit utilization of a trading entity in accordance with the at least one instruction. For instance, if the at least one instruction instructs node server 1004 to only use a fine precision algorithm, node server 1004 may use the fine precision algorithm to determine credit utilization of the trading entity. In another example, if the at least one instruction instructs node server 1004 to use a credit threshold to determine whether to use a coarse precision algorithm and a fine precision algorithm, node server 1004 may use the coarse precision algorithm until determining that the credit utilization meets or exceeds the credit threshold. As long as the credit utilization meets or exceeds the credit threshold, node server 1004 may apply the fine precision algorithm for determining the credit utilization. If the credit utilization falls below the credit threshold, node server 1004 may resume applying the coarse precision algorithm as long as the credit utilization remains below the credit threshold. It is noted that credit utilization determined using the coarse precision algorithm may differ from credit utilization determined using the fine precision algorithm. Node server 1004 may compare the credit utilization determined using the coarse or fine precision algorithm to an allocated credit limit to determine whether to permit or deny authorization to execute an order or a trade. The method of FIG. 13 may end, may repeat one or more times, or may return to any of the preceding blocks.

Advantages of the invention include the ability to provide in-line credit controls on every order request and/or trade request without the negatives of added latency and without the risk of exceeding limits of asynchronous controls that may occur in certain edge conditions (e.g., initial large order/trade that violates a credit limit). Additionally, the example distributed credit control system may employ a communication mechanism to distribute credit across multiple order entry connections or even trading venues (e.g., including SEFs).

Advantages of the example embodiments may also include the ability to provide risk offsets between different nodes through management server 1002, which may be a centralized, out-of-band credit component. Further advantages may include the ability to enforce in-line credit controls and tailor credit checks based on trade frequency of a node servicer (e.g., low latency for high throughput).

Embodiments of the present invention can be extended for any market, future, option, forward, OTC, or other financial instrument or investment vehicle with a defined set of weights or conversion rules to compare all traded contracts against a set of user defined values. It is contemplated that financial instruments and investment vehicles herein are interrelated. For example, it is contemplated that a trader may trade a future, followed by an option on that future. Such a position is known as hedging. Alternatively and additionally, it is contemplated that traders may use OTC and futures in a risk offsetting manner as would be appreciated by those in the art. Other examples include incidents such as a stock and an index. These values can be defined statically or can be defined dynamically on a relative basis for time or even volatility. This can also be applied with a user defined set of models or relationships between contracts or asset clauses.

The present invention has been described herein with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit, and scope of the invention. For example, aspects of the invention are not limit to implementations that involve the trading of derivative products. Those skilled in the art will appreciate that aspects of the invention may be used in other markets. Credit market transactions, for example, involve risk parameters in the form of duration risk and default risks. The processing of appropriate orders in credit markets may include analyzing duration risk utilization and default risk utilization.

What is claimed is:

1. A computer implemented method comprising:
processing, by a processor of a first node server, at least one instruction to use a coarse precision algorithm and a fine precision algorithm for calculating credit utilization of a trading entity, wherein the instruction specifies use of the coarse precision algorithm until determining that a credit threshold is met or exceeded and specifies use of the fine precision algorithm after determining that the credit threshold has been met or exceeded, and wherein the coarse precision algorithm is different from the fine precision algorithm;
processing, at the first node server, an order request or a trade request associated with the trading entity for trading of a financial instrument; and
determining, by the processor of the first node server, the credit utilization of the trading entity in accordance with the at least one instruction.

2. The method of claim 1, wherein the determining of the credit utilization further comprises determining, using the coarse precision algorithm, the credit utilization prior to execution of an order specified in the order request or a trade specified in the trade request.

3. The method of claim 1, wherein the determining of the credit utilization further comprises, in response to the fine precision algorithm determining that the credit utilization does not exceed an allocated credit limit associated with the trading entity, permitting execution of the order or of the trade, and communicating data on the second-credit utilization to a management computer.

4. The method of claim 1, further comprising determining that the credit utilization exceeds an allocated credit limit associated with the trading entity.

5. The method of claim 4, further comprising preventing execution of the order or the trade.

6. The method of claim 4, further comprising:
communicating a request for additional credit; and
receiving a response to the request.

7. The method of claim 6, further comprising;
permitting execution of the order or the trade as a result of the response allocating additional credit.

8. The method of claim 6, further comprising:
preventing execution of the order or the trade as a result of the response not allocating the additional credit.

9. The method of claim 1, wherein the coarse precision algorithm is executable more quickly and provides a less accurate determination of credit utilization than the fine precision algorithm.

10. An apparatus comprising:
at least one processor; and
at least one memory storing executable instructions that, when executed by the at least one processor, cause the apparatus at least to perform:
processing at least one instruction to use a coarse precision algorithm and a fine precision algorithm for calculating credit utilization of a trading entity, wherein the instruction specifies use of the coarse precision algorithm until determining that a credit threshold is met or exceeded and specifies use of the fine precision algorithm after determining that the credit threshold has been met or exceeded, and wherein the coarse precision algorithm is different from the fine precision algorithm;
processing an order request or a trade request associated with the trading entity for trading of a financial instrument; and
determining the credit utilization of the trading entity in accordance with the at least one instruction.

11. The apparatus of claim 10, wherein the determining of the credit utilization further comprises determining, using the coarse precision algorithm, the credit utilization prior to execution of an order specified in the order request or a trade specified in the trade request.

12. The apparatus of claim 10, wherein the determining of the credit utilization further comprises, in response to the fine precision algorithm determining that the credit utilization does not exceed an allocated credit limit associated with the trading entity, permitting execution of the order or the trade, and communicating data on the credit utilization to a management computer.

13. The apparatus of claim 10, wherein the coarse precision algorithm is executable more quickly and provides a less accurate determination of credit utilization than the fine precision algorithm.

14. A non-transitory computer readable medium storing executable instructions that, when executed, cause an apparatus to perform operations comprising:
processing at least one instruction to use a coarse precision algorithm and a fine precision algorithm for calculating credit utilization of a trading entity, wherein the instruction specifies use of the coarse precision algorithm until determining that a credit threshold is met or exceeded and specifies use of the fine precision algorithm after determining that the credit threshold has been met or exceeded, and wherein the coarse precision algorithm is different from the fine precision algorithm;
processing an order request or a trade request associated with the trading entity for trading of a financial instrument; and
determining the credit utilization of the trading entity in accordance with the at least one instruction.

15. The computer readable medium of claim 14, wherein the determining of the credit utilization further comprises determining, using the coarse precision algorithm, the credit utilization prior to execution of an order specified in the order request or a trade specified in the trade request.

16. The computer readable medium of claim 14, wherein the determining of the credit utilization further comprises, in response to the fine precision algorithm determining that the credit utilization does not exceed an allocated credit limit associated with the trading entity, permitting execution of the order or the trade, and communicating data on the credit utilization to a management computer.

17. The computer readable medium of claim 14, wherein the coarse precision algorithm is executable more quickly and provides a less accurate determination of credit utilization than the fine precision algorithm.

* * * * *